SYSTEM OF PATENT
APPLICATION SERIAL
NO. 310,991
FILED SEPT. 24, 1963
WITH MODIFICATIONS

INVENTORS
John Suozzo and
Henry C. Savino.

BY C. L. Freedman
ATTORNEY

United States Patent Office 3,519,104
Patented July 7, 1970

3,519,104
ELEVATOR AVAILABLE CAR SYSTEM INCLUD-
ING UNIQUE CAR ASSIGNING MEANS
John Suozzo and Henry C. Savino, Hackensack, N.J., as-
signors to Westinghouse Electric Corporation, Pitts-
burgh, Pa., a corporation of Pennsylvania
Filed Apr. 30, 1965, Ser. No. 452,216
Int. Cl. B66b 1/06
U.S. Cl. 187—29                                      13 Claims

ABSTRACT OF THE DISCLOSURE

In an elevator system a predetermined number of priority down floor calls prevents an elevator from answering an up floor call for a floor above the highest floor for which a car call is registered in the elevator. If a first car assigned to a floor call is traveling up through an express zone when a second car becomes available in a more advantageous position the assignment is transferred to the latter car. A car may be parked at a floor above the express zone. Scanning for an available car for a call above an express zone starts in a high zone.

---

Features of the system herein illustrated are shown in our copending patent applications, Ser. Nos. 94,723; 110,-464; 220,522 and 310,991 filed respectively on Mar. 10, 1961, May 16, 1961; Aug. 30, 1962 and Sept. 24, 1963. Pats. 3,256,958 and 3,292,736 have issued for the first two of these applications.

This invention relates to transportation systems, and it has particular relation to transportation systems wherein a plurality of vehicles are arranged in a structure to operate as a bank.

Expressions such as "traffic demand," "service demand" and "traffic condition" herein are employed to designate traffic pictures which may be utilized for specified control purposes. As is pointed out below, such traffic demands or conditions may include calls for transportation service registered by call means, loading of transportation cars, car stopping, direct functions or rate functions.

A transportation system may be designed for attendant operation or for automatic operation. In attendant operation, an attendant located in each of the vehicles is available for supervising the loading of his vehicle, the unloading of the vehicle and the dispatch of the vehicle from a landing. Although aspects of the invention may be incorporated in transportation systems employing either a single vehicle or a number of vehicles arranged in a bank, and although aspects of the invention may be incorporated in systems arranged either for automatic operation or attendant operation, the entire invention is particularly suitable for and may be considered adequately with reference to a bank of elevator cars arranged for automatic operation. For this reason, the following discussion will be directed primarily to such an elevator system.

In a bank of elevator cars arranged for automatic operation, the cars may operate principally between two terminal landings or floors, which consist generally of an upper terminal floor and a lower terminal such as a main, street or first floor. A plurality of intermediate landings or floors are located between the two terminal floors. Additionally, one or more of the elevator cars in the bank may serve a top extension or penthouse floor. Finally, certain or all of the cars also may provide service for a lower extension floor, such as a basement floor. However, the invention is applicable to a system having no extension floor.

The invention is particularly applicable to a system of the type shown in our copending patent application, Ser. No. 310,991, filed Sept. 24, 1963. The system serves a structure whose floors above the lower terminal floor are divided into a plurality of separate up and down zones. Each of these zones may comprise either one floor or a plurality of adjacent floors, depending upon factors such as the total number of floors served by the system, the number of elevator cars in the system, special traffic conditions which may be encountered at a particular floor or group of floors and the quantity and cost of equipment required. It will be understood that the number of down zones need not necessarily equal the number of up zones and that the same floor or floors need not necessarily be included in both a particular down zone and a particular up zone.

In such a system, the registration of a floor call for elevator service may be accompanied by the registration of a demand for service for the zone in which the corresponding floor is located. In response to a zone demand for service, an available elevator car is assigned to serve the zone for which each floor call is registered which resulted in the registration of the zone service demand. If a plurality of cars at different locations are available for this purpose, only that one of such cars is selected which is in the best position to render the desired service. The present invention will be discussed with reference to a system of this type.

Tests have demonstrated that the system of our above-mentioned patent application provides exceptionally efficient service. The present invention provides even more efficient service.

False registration of calls for elevator service interfere with orderly response of an elevator system to legitimate calls for elevator service. Thus intending passengers desirous of traveling down from intermediate floors of a building may register calls for up service to stop up-traveling cars. This practice slows service in the down direction. The invention minimizes response to such false calls.

Also the system may be arranged to encourage the presence of a predetermined minimum number of cars, if available, at a predetermined floor as continuously as possible. This facilitates traffic movement from a busy floor.

If an available first car on a first side of a long express zone is assigned to a service zone on a second side of the express zone a substantial time, possibly longer than twenty seconds, may be required for transit through the express zone. In accordance with the invention, if a more advantageously located second car becomes available while the first car is in the express zone the assignment is transferred to the second car.

It is, therefore, an object of the invention to provide an efficient transportation system.

In accordance with a preferred embodiment of the invention if only one car is at a main floor and is loaded in excess of a predetermined value a number of available cars are started for the main floor. A lesser number may be started should certain of the cars be traveling towards the main floor. This expedites service for the main floor.

Service also is expedited by conditioning the cars to ignore certain calls such as up floor calls. Thus if a substantial demand for down service is registered a car may be conditioned to bypass up floor calls, particularly if the car has no further car call to be answered.

A still further expediting of service in the preferred embodiment is effected in the case of a first car running up in an express zone after assignment to answer a floor call for service above the express zone. If a car becomes available above the express zone it is assigned to answer the floor call for service without waiting for the first car to complete its trip through the express zone. Also a car may be parked above the express zone under certain conditions to be closer to a future demand for service. When a floor call for service is registered above an express zone the search for an available car preferably starts in a high zone. This futher expedites service by selecting a car closer to the floor requesting service.

It is, therefore, an object of the invention to provide a vehicle system which expedites service by starting a vehicle for a main landing when loading of another vehicle at the main landing indicates a possible shortage of service for such landing.

It is another object of the invention to provide a vehicle system which expedites service by transferring assignment of vehicle to a floor call for service on one side of an express zone when a vehicle becomes available closer to the floor requiring service.

It is also an object of the invention to provide a vehicle system which expedites service by parking a vehicle above an express zone under certain conditions.

It is a further object of the invention to provide a vehicle system which expedites service by conditioning a vehicle to ignore calls for service in one direction in the presence of a substantial demand for service in the opposite direction.

It is a further object of the invention to provide an improved elevator system wherein a predetermined demand for down service restrains an up-traveling car having car calls from responding to floor calls for up service.

It is an added object of the invention to provide an elevator system wherein a second car is expedited to replace a first car leaving a floor.

It is also an object of the invention to provide an elevator system which expedites assignment of an available elevator car to a service zone spaced from a terminal floor by an express zone.

Other objects of the invention will be apparent from the following description, taken in conjunction with the accompanying drawings, in which.

Figure 1:
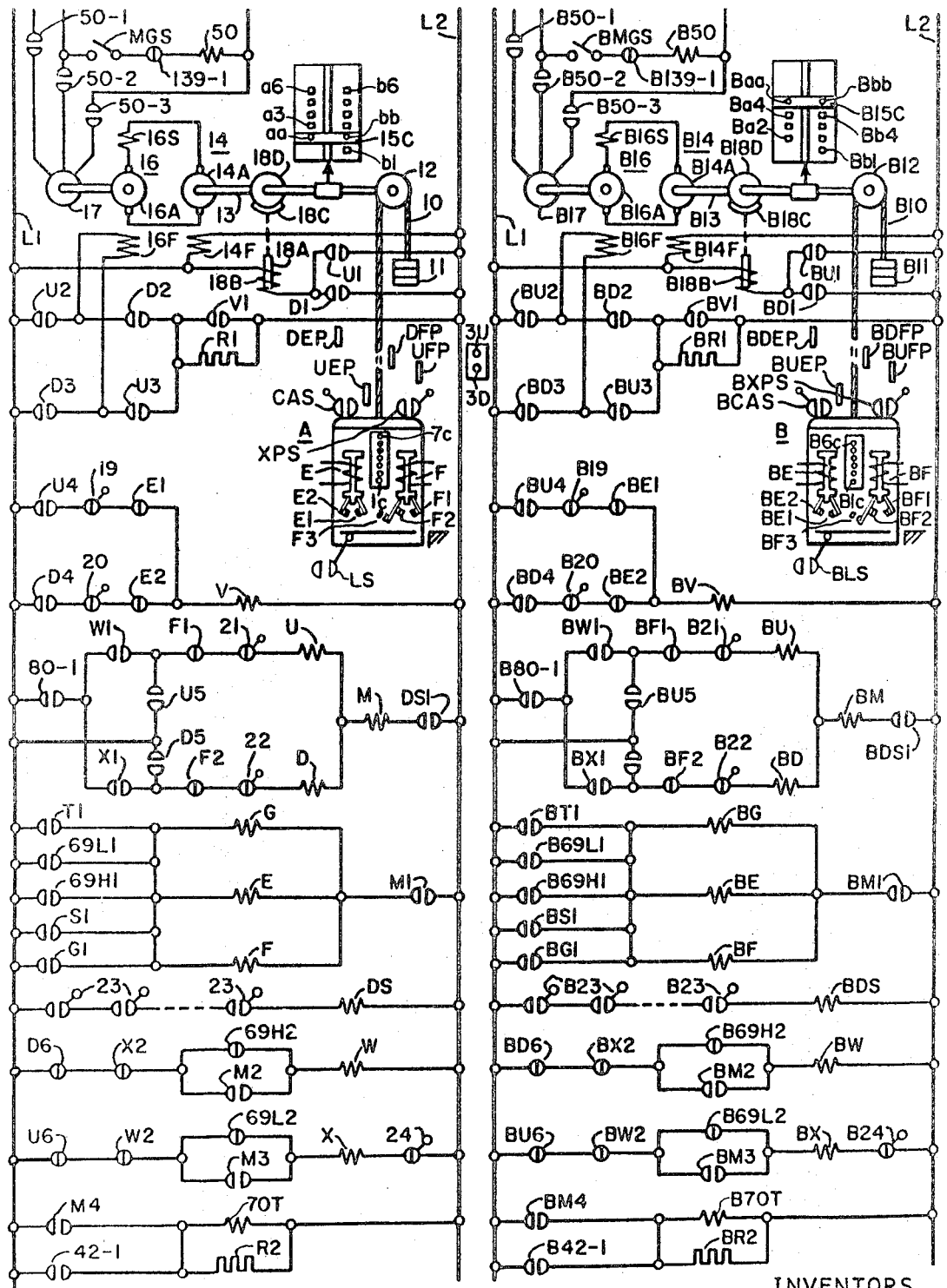
FIG. 1 is a schematic view in straight-line form of a portion of an elevator control system embodying the invention.

Although aspects of the invention may be incorporated in an elevator system having any desired number of elevator cars, arranged either for attendant operation or for automatic operation to serve any desired number of floors, the invention may be described adequately with reference to an elevator system arranged for fully automatic operation and serving a building or structure having six principal floors and a top extension or seventh floor. For this reason, the illustration and description of the invention will be directed particularly to such a system. Furthermore, a system comprising a bank of three elevator cars will suffice for the discussion of certain aspects of the invention, while other features thereof may be more clearly explained by reference to a system having four cars. In addition, for illustrative purposes the second through sixth floors served by the elevator system normally will be divided into first, second and third down zones, while the intermediate or second through fifth floors will be divided into low and high up zones. The first down zone comprises the second and third floors, the second down zone includes the fourth and fifth floors and the third down zone comprises the sixth floor. The low up zone includes the second and third floors and the high up zone comprises the fourth and fifth floors.

The elevator cars of the system, three or four as the case may be, are designated by the reference characters A, B, C and D. It will be assumed for present purposes that only the cars A and C are capable of serving the top extension or seventh floor, while each of the remaining or six principal floors may be served by every car in the system.

Inasmuch as certain circuits for each of the elevator cars generally are similar, circuits for the elevator cars A and B are shown in substantial detail, and components for the elevator cars C and D are introduced as required for the discussion. Insofar as is practicable, circuits and components for the elevator car A are illustrated in the left column of FIGS. 1 through 6 and 16, and circuits for the elevator car B in the right column of such figures. FIGS. 7 through 15 and 17 in general illustrate circuits which are common to all of the elevator cars.

The equipment and control circuits for the elevator cars A, B, C and D include many similar components. For this reason, components for the cars B, C and D which are similar to a corresponding component for the elevator car A are identified by the reference character employed for the car A component preceded by the prefixes B, C and D, respectively. For example, associated with the elevator cars A, B, C and D are the next car relays N, BN, CN and DN. For these reference characters, the prefixes B, C and D indicate that the relays BN, CN and ND are associated, respectively, with the elevator cars B, C and D.

Electromagnetic switches and relays employed in the control circuits may have numerous contacts of either or both of two types. One type may be referred to as back or break contacts. Such contacts are closed when the associated switch or relay is deenergized and dropped out. The contacts are opened when the associated switch or relay is energized and picked up. The second type of contacts may be referred to as front or make contacts. Such contacts are opened when the associated switch or relay is deenergized and dropped out. These contacts are closed when the associated switch or relay is energized and picked up. The relays and switches in the accompanying schematic views are illustrated in their deenergized and dropped out conditions.

Each set of contacts of a relay or switch is designated by the reference character employed for the relay or switch, followed by a suitable numeral specific to the set of contacts. For example, the reference characters U1 and U6 designate, respectively, the first and sixth sets of contacts associated with the up switch U of the elevator car A.

In order to simplify the presentation of the invention, the present description will be based on the system of our above-mentioned patent application Ser. No. 310,991 with modifications suitable for incorporating our present invention.

This application will be referred to below and may be termed the "reference" patent application.

Certain apparatus common to our aforesaid reference patent application and the present patent application is listed below. The only differences are that for certain of the relays and switches, contacts are added for the present patent application. These additions will be apparent from the later discussion.

APPARATUS FOR ELEVATOR CAR A

D—Down switch
DC—Door-close solenoid
DCA—Down call above relay
DEP—Down decelerating inductor plates
DFP—Down stopping inductor plates
DO—Door-open solenoid
DS—Door relay
E—Inductor slowdown relay
F—Inductor stopping relay
FA—Down call assigned relay
FCR—Demand response relay
FR—Available car relay
FRS—Auxiliary available car relay
FU—Up call assigned relay
FUH—High up zone assigned relay G—Holding relay
HLC—High zone low floor relay
KA—Assigned zone stepping switch
KB—Down zone call below relay
KF—Convention floor loading relay
KFT—Convention floor timing relay
LB—Detector relay
LS—Load switch
LW—Load relay
M—Running relay
MGS—Manually-operable switch
N—Next car relay
ND—Notching relay
P—Parking relay
PX—Spotting loading relay
RA—First auxilary running relay
S—Floor call stopping relay
SH—Down zone assigned relay
SS—Start relay
ST—Assigned zone stopping relay
T—Car call stopping relay
TDS—Priority zone stopping relay
U—Up switch
UEP—Up decelerating inductor plates
UFP—Up stopping inductor plates
V—Speed relay
W—Up preference relay
X—Down preference relay
ZC—Convention floor position relay
Z0, Z1, Z1A, Z2, Z3—Zone position relays
1C through 7C—Car call push buttons
1CR through 7CR—Car call registering relays
10—Rope
11—Counterweight
12—Sheave
14—Direct-current motor
15—Floor selector
16—Direct-current generator
17—Induction motor
18B—Brake coil
38R—Car call above relay
42—Auxiliary door-control relay
45—Door-control relay
50—Motor-generator starting relay
69H—Hight call reversal relay
69L—Low call reversal relay
70T—Non-interference relay
78D—Up call below relay
78U—Up call above relay
80—Second auxiliary running relay
139—Motor-generator shutdown relay
981—Lower terminal no-start relay

APPARATUS COMMON TO ALL CARS

AH—Master high up zone assigned relay
AHC—Highest down call relay
AL—Low up zone assigned relay
DT—Down by-pass timing relay
DU—Up zone demand relay
DUL—Low up zone demand relay
DUH—High up zone demand relay
FRM—Master available car relay
FSH—High zone stepping switch
FSL—Low zone stepping switch
FZM—Master zone relay
FZT—Zone resetting relay
FZ0, FZ1, FZ1A, FZ2, FZ2A, FZ3—Zone relays
F0C, F1C, F1CA, F2C, F2CA, F3C—Assigned zone relays
H—Motor-generator running relay
KBH—High zone demand relay
KBL—Low zone demand relay
KH—High up zone call relay
KHT—High up zone timing relay
KL—Low up zone call relay
KLT—Low up zone timing relay
KMT—Down zone priority relay
K0, K1, K1A, K2, K2A, K3—Down zone demand registering relays
K1T, K1TA, K2T, K2TA, K3T—Down zone timing relays
L1, L2—Direct-current buses
LNT—Absence timing relay
MCA—Master down call above relay
MFB—Lower terminal surplus car relay
MFC—Multiple available car relay
MG—Motor-generator timing relay
MKF—Master convention floor loading relay
MN—Master next car relay
MX—Master down preference relay
MZO—Master car position relay
NDH—Intense up peak relay
NDR—No demand return relay
NFT—Loading relay
NL—Lonely car relay
PD—Instant dispatch relay
PM—Spotting interrupting relay
PR—Spotting resetting relay
PRS—Spotting stepping switch
P2 through P6—Floor spotting relays
RNS—No scan relay
RY—Spotting resumption relay
SC—Down demand mid-point relay
SCR—Pulsing relay
SCT—Firing relay
SFB—Lower terminal non-next relay
SHN—High zone no selection relay
SLN—Low zone no selection relay
SP—Spotting transfer relay
SZ—Down demand mid-point stepping switch
SZR—Scan relay
TZ—Zone transfer relay
UHT—First loading interval relay
UT—Second loading interval relay
YT—Spotting interrupting timing relay
ZD—Down zone demand relay
Z1U—Low up zone position relay
Z2U—High up zone position relay
1U through 6U—Up floor-call push buttons
2D through 7D—Down floor-call push buttons
3BP, 5BP—Passing relays
1UR through 6UH—Up floor call registering relays
2DR through 7DR—Down floor call registering relays
69P—Closest car relay
77D—Down by-pass relay
77U—Up by-pass relay
911R—Clearance relay
982—Master lower terminal relay In addition to the foregoing apparatus, certain relays common to both patent applications conveniently may be listed separately as follows, since they do not, strictly speaking, fall within either of the above categories.

DH—High zone demand relay
DHX—High zone down relay
DL—Low zone demand relay
DLX—Low zone down relay
FOH—Assigned zone relay
HLC and CHLC—High zone low floor relays
BLLC and DLLC—Low zone high floor relays
KR—Lower terminal extension demand relay
RD—Extension floor demand relay
TES—Extension car scanning relay
TEU—Extension car up relay
ZR—Extension floor position relay Since many similar components are employed in the apparatus and control circuits for the elevator cars A, B, C and D, the description of the apparatus and control circuits will be directed primarily to those associated with the car A. With the notation employed, similar components employed for the other elevator cars readily may be traced. Where different components are employed for certain of the elevator cars, these different components will be discussed as required.

The following apparatus is specific to the present patent application:

APPARATUS FOR CAR A

AXP—Express zone position relay
CAS—Cam operated switch
PA—Special parking relay
RE—Express zone selectable car relay
XH—Service zone relay
XP—Express zone relay

APPARATUS COMMON TO ALL CARS

Figure 3:
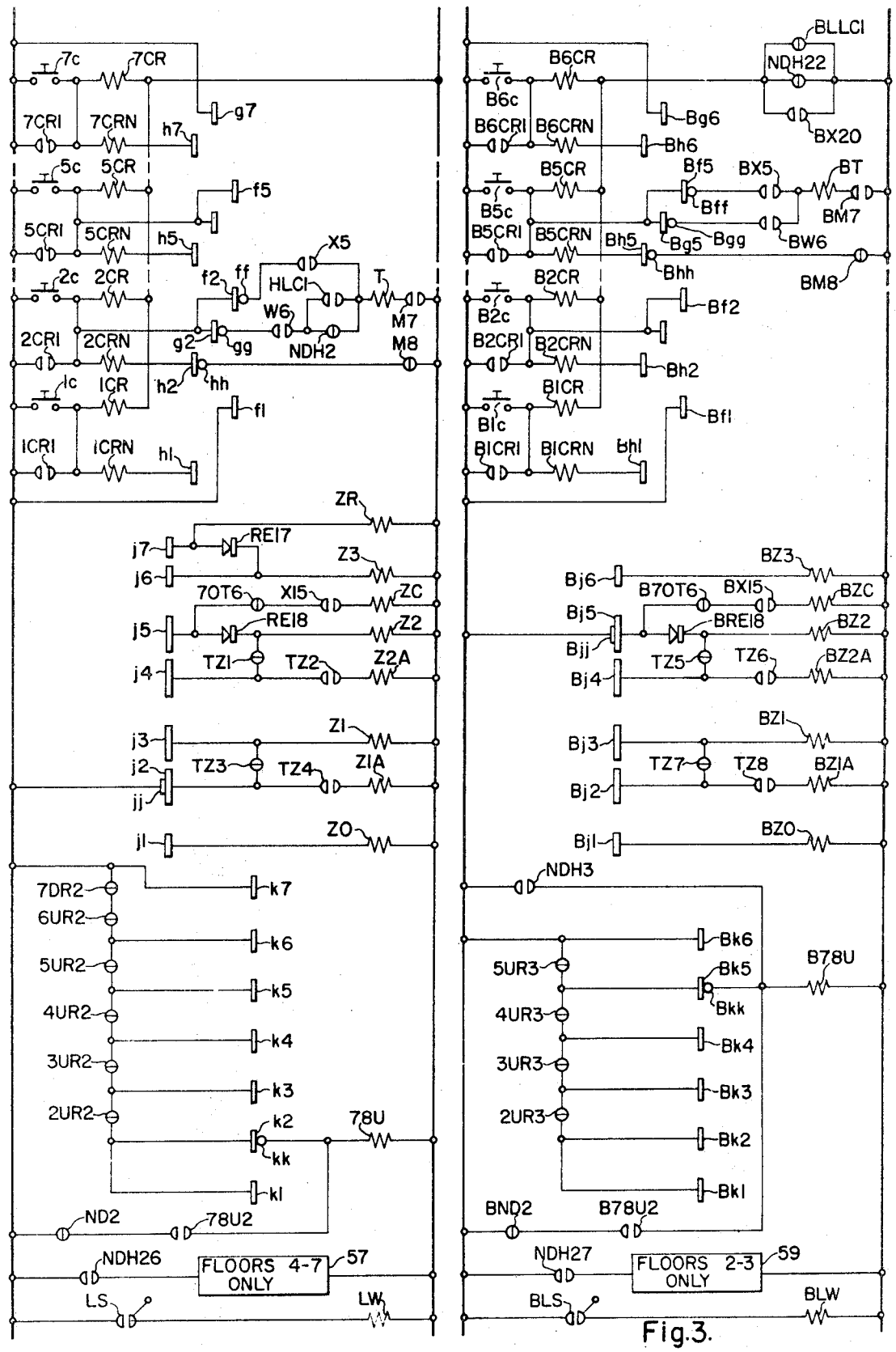
Figure 13:
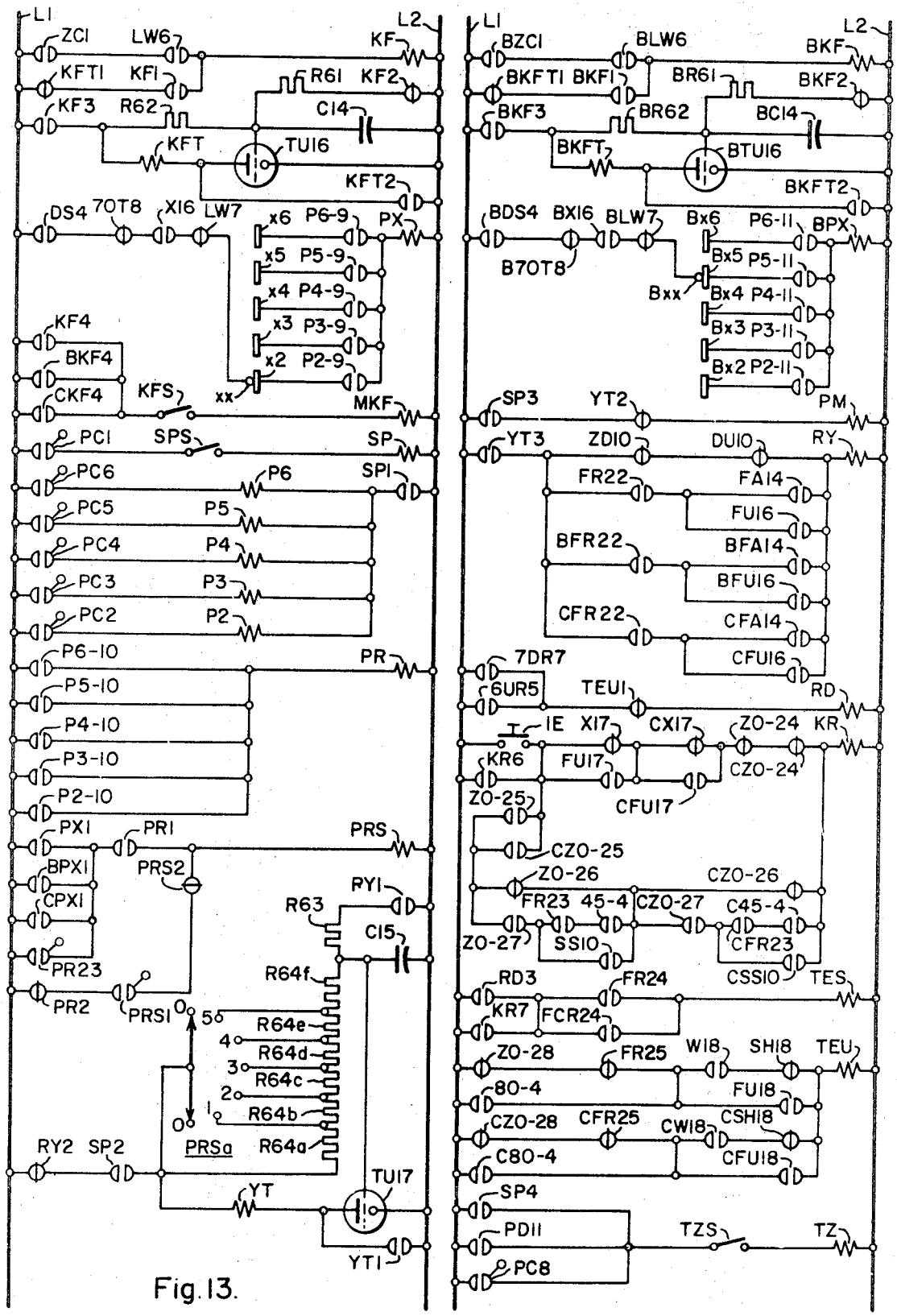
Figure 14:
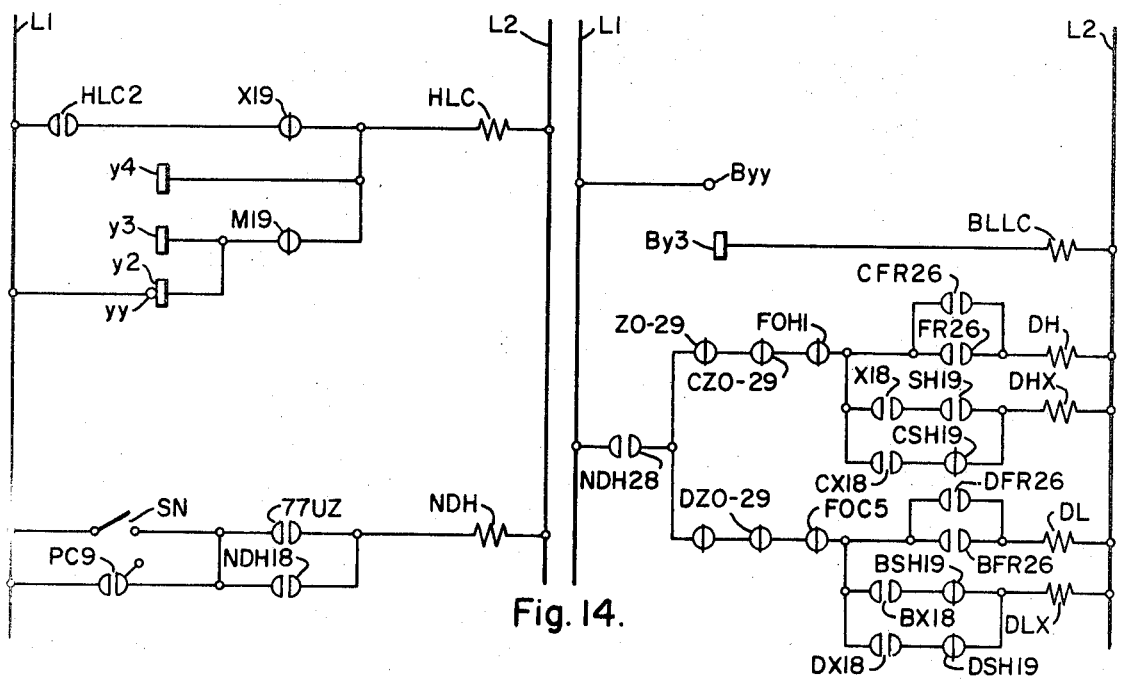

AE—Car away relay
AVM—Main floor available car relay
DCU—Master dispatch relay
NDRT—Auxiliary timing relay
QNDR—Main floor expediting relay
Q39—Plural MG relay
SD—Special demand relay
SDT—Timing relay
UAV—Away available car relay
UCO—Down wait quota relay
XPD—Express down relay
2FR—Double availability relay
3FR—Treble availability relay FIGS. 3, 13, and 14 are identical to FIGS. 3, 13, and 14 respectively of our aforesaid reference patent application.

FIG. 1 is similar to FIG. 1 of our above-mentioned patent application except for the addition of a switch CAS which is closed when the car A is near the upper end of an express zone, and a switch XPS which is closed while the car A is in the express zone. Similar switches are shown for the car B.

Figure 2:
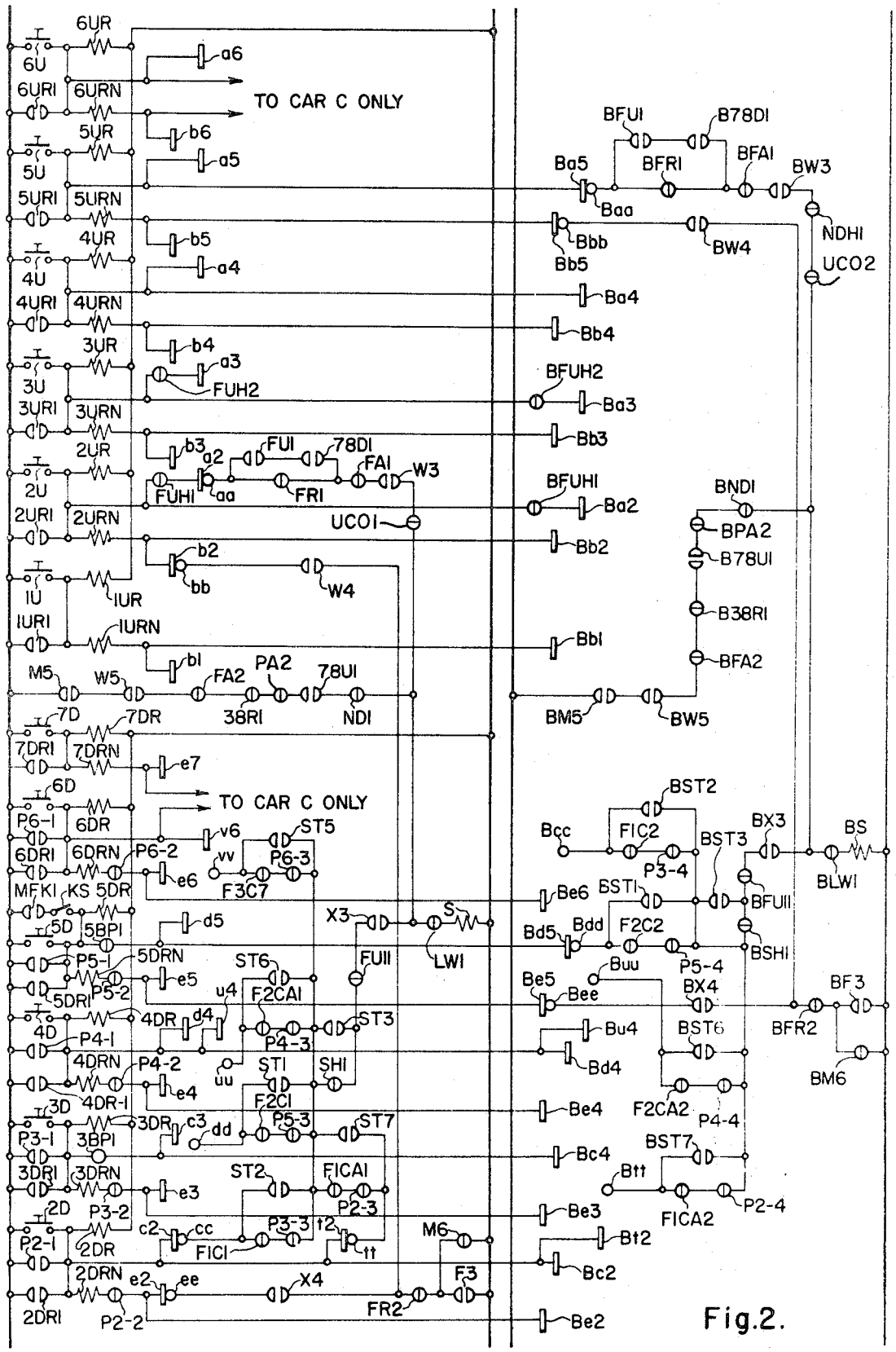
FIGS. 2 through 17 are schematic views with circuits shown in straight-line form of further portions of the elevator control system illustrated in FIG. 1.

FIG. 2 is similar to FIG. 2 of our aforesaid patent application except for the addition of break contacts UCO1 and UCO2 of a down wait quota relay UCO, and break contacts PA2 of a special parking relay PA. When the contacts UCO1 are open they prevent energization of the floor call stopping relay S in response to registered up floor calls. The contacts UCO2, when open, similarly prevent energization of the floor call stopping relays BS.

When the contacts PA2 are open they prevent energization of the stopping relay S through an alternate circuit. Similar contacts BPA2 are added for the car B.

Figure 4:
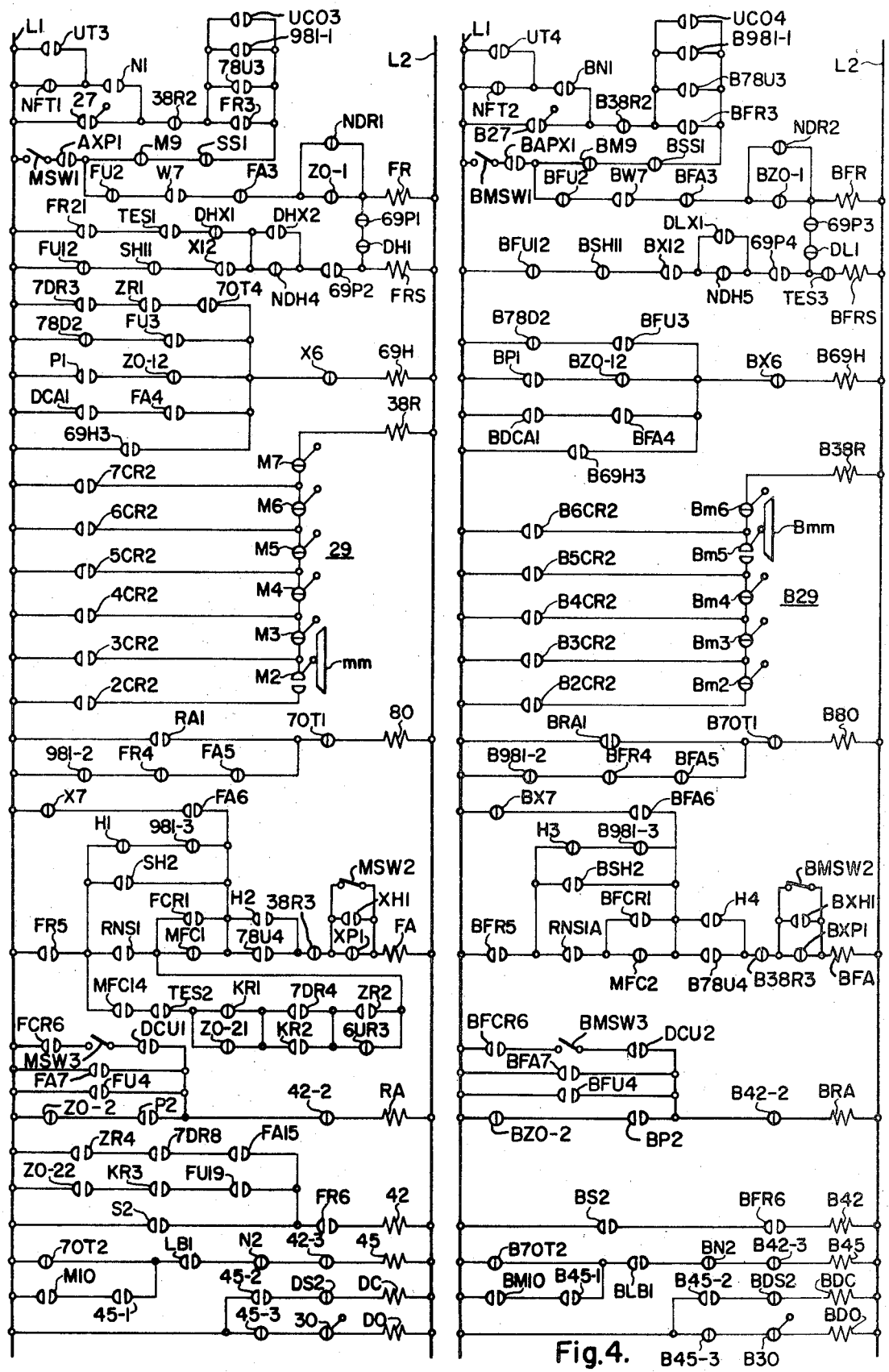

FIG. 4 differs from FIG. 4 of our aforesaid reference patent application by the addition of make contacts UCO3 and UCO4 of the down wait relay UCO. If the contacts UCO3 are closed, the available car relay FR can be energized even though the contacts 981–1, 78U3 and FR3 are all open. The contacts UCO4 are associated similarly with the available car relay BFR.

FIG. 4 also differs from FIG. 4 of our aforesaid reference patent application by the provision of make contacts AXP1 which are closed when the car A is adjacent the upper end of an express zone. The contacts AXP1 are connected through a manually-operated switch MSW1 to establish an alternate path of energization for the available car relay FR. Similar components are provided for the car B. For present purposes the switches MSW1 and MSW2 are assumed to be open.

FIG. 4 further differs from FIG. 4 of our aforesaid reference patent application by the provision of break contacts XP1 of an express zone relay XP. These contacts are in series with the down call assigned relay FA and are open while the car A is in an express zone. The contacts XP1 are shunted by make contacts XH1 of a service zone relay XH. These contacts XH1 are closed when the car A reaches a predetermined distance from the end of an express zone. The contacts XP1 also are shunted by a manually-operated switch MSW2 which is assumed to be closed for the present. Similar components are provided for the car B.

Finally, FIG. 4 differs from FIG. 4 of our aforesaid reference patent application by providing additional contacts FCR6 and DCU1 and a manually-operated switch MSW3. When the contacts 42–2 are closed, an alternate energizing circuit for the first auxiliary running relay RA is provided which includes in series the make contacts FCR6 of the demand response relay FCR, the manually-operated switch MCW3 and the make contacts DCU1 of a master dispatch relay DCU. The contacts DCU1 close when the relay DCU dispatches available cars from the main floor in a manner to be discussed below. Similar components are provided for the car B. For present purposes the switches MSW3 and BMSW3 are assumed to be open.

Figure 5:
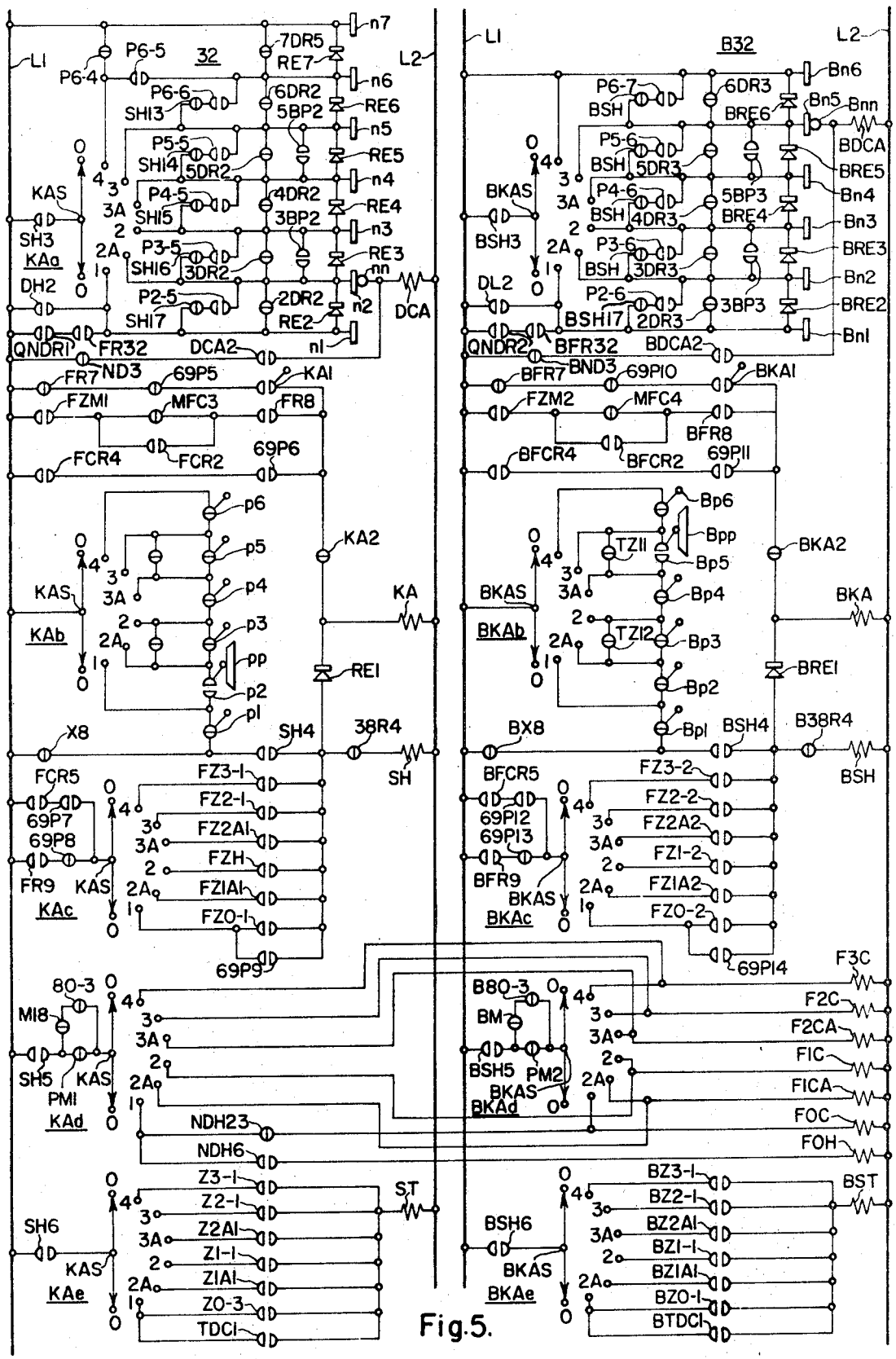

FIG. 5 is similar to FIG. 5 of our aforesaid reference patent application except that a set of make contacts QNDR1 in series with a set of make contacts FR32 are shunted across the make contacts DH2 in the circuits for the down call above relay DCA. The make contacts QNDR1 of the main floor expediting relay QNDR close when additional cars are needed at the main floor. The contacts FR32 close if the car A is available. Similar contacts QNDR2 and BFR32 may be connected across the contacts DL2 for the car B.

Figure 6:
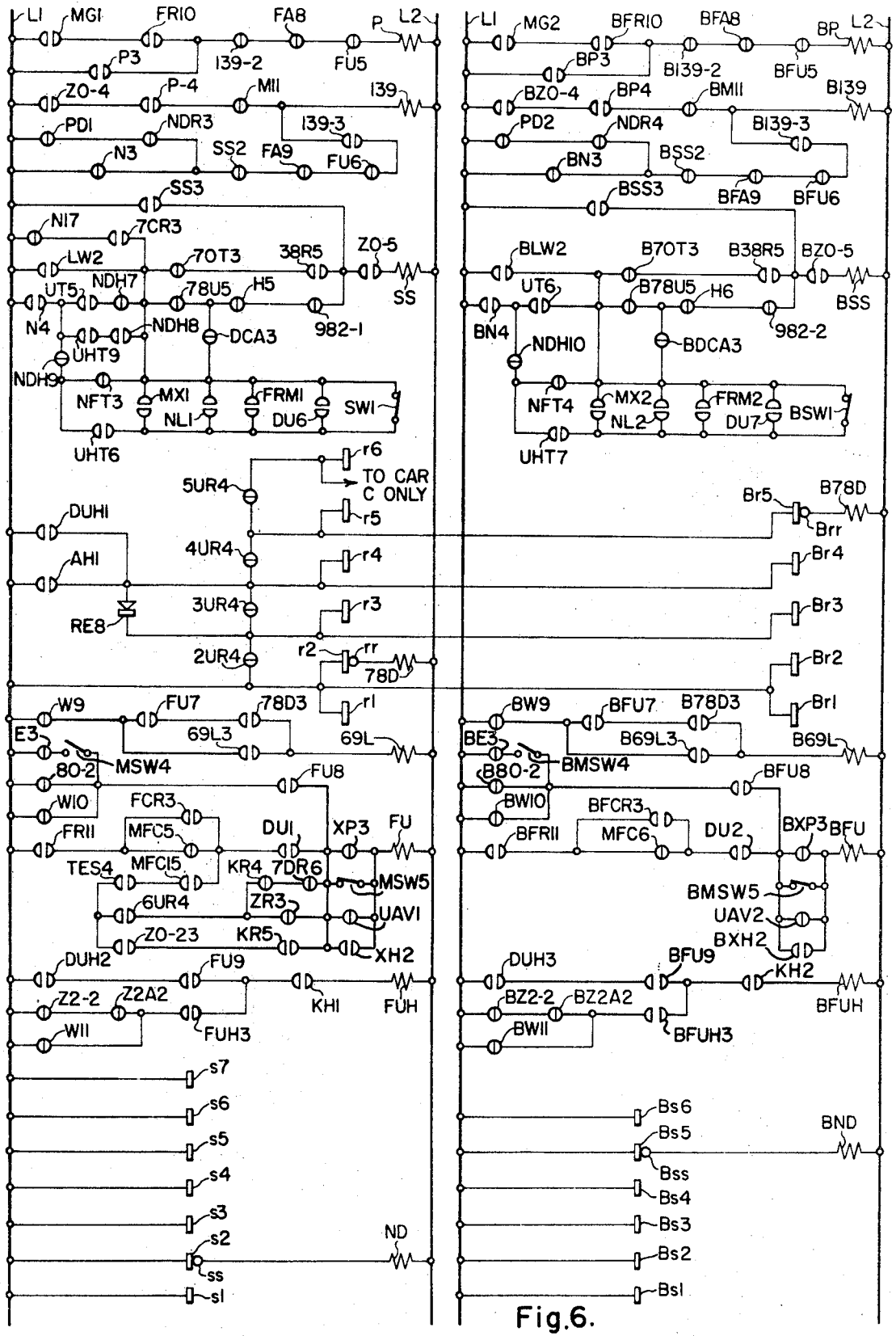

FIG. 6 differs from FIG. 6 of our aforesaid reference patent application by providing break contacts XP3 of the express zone relay XP in series with the coil of the up call assigned relay FU. Several shunts also are added for the contacts XP3. Thus these contacts are shunted by a manually-operated switch MSW5 which is assumed for the present to be closed. The contacts XP3 also are shunted by break contacts UAV1 of an away available car relay UAV. The contacts XP3 further are shunted by make contacts XH2 of the service zone relay XH. The contacts 80–2 are shunted through a manually-operated switch MSW4 and break contacts E3 of the inductor slow down relay E. Similar components are shown for the car B.

Figure 7:
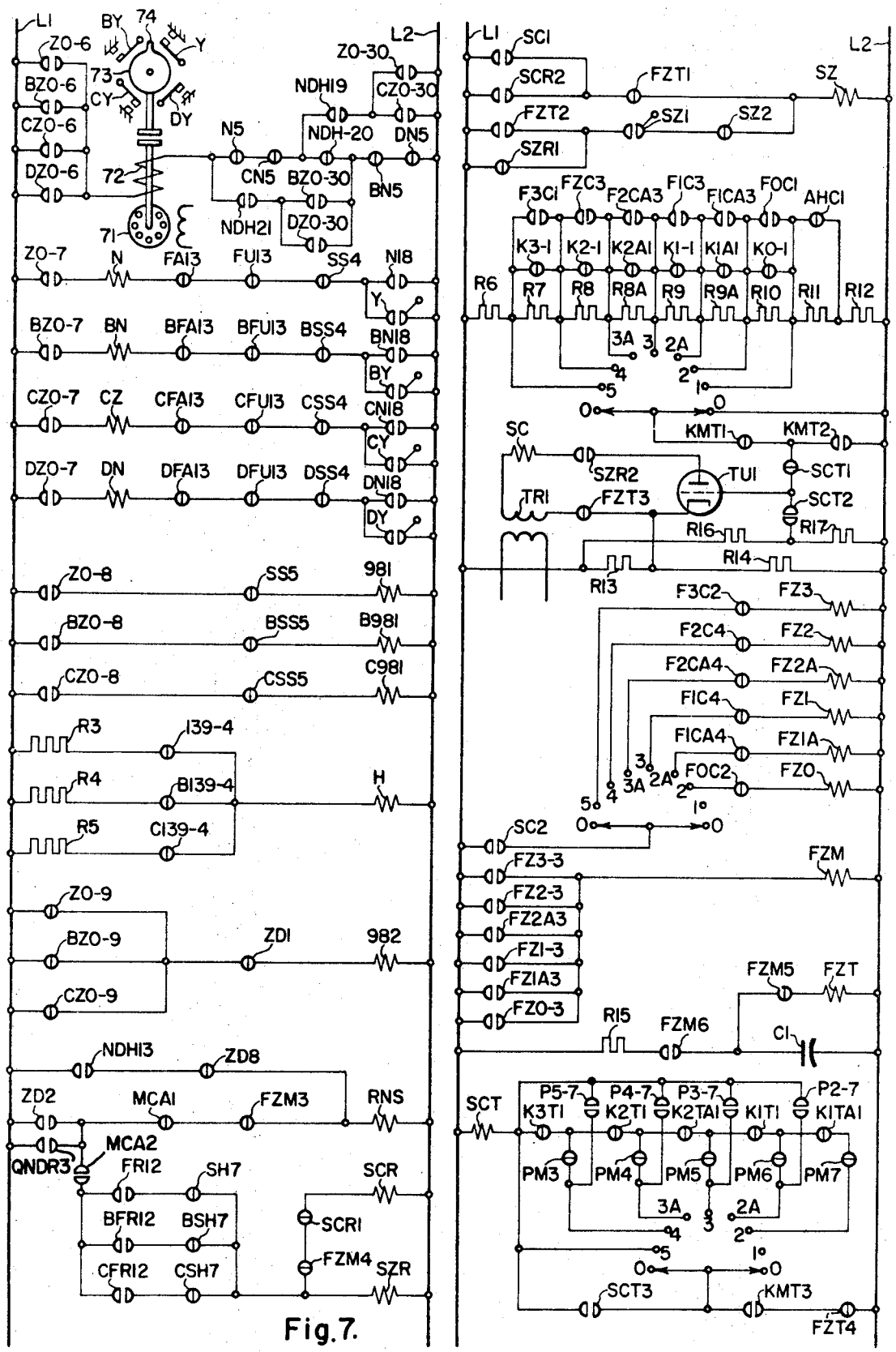

FIG. 7 differs from FIG. 7 of our aforesaid reference patent application by the addition of make contacts QNDR3 of the main floor expediting relay QNDR in shunt across the contacts ZD2.

Figure 8:
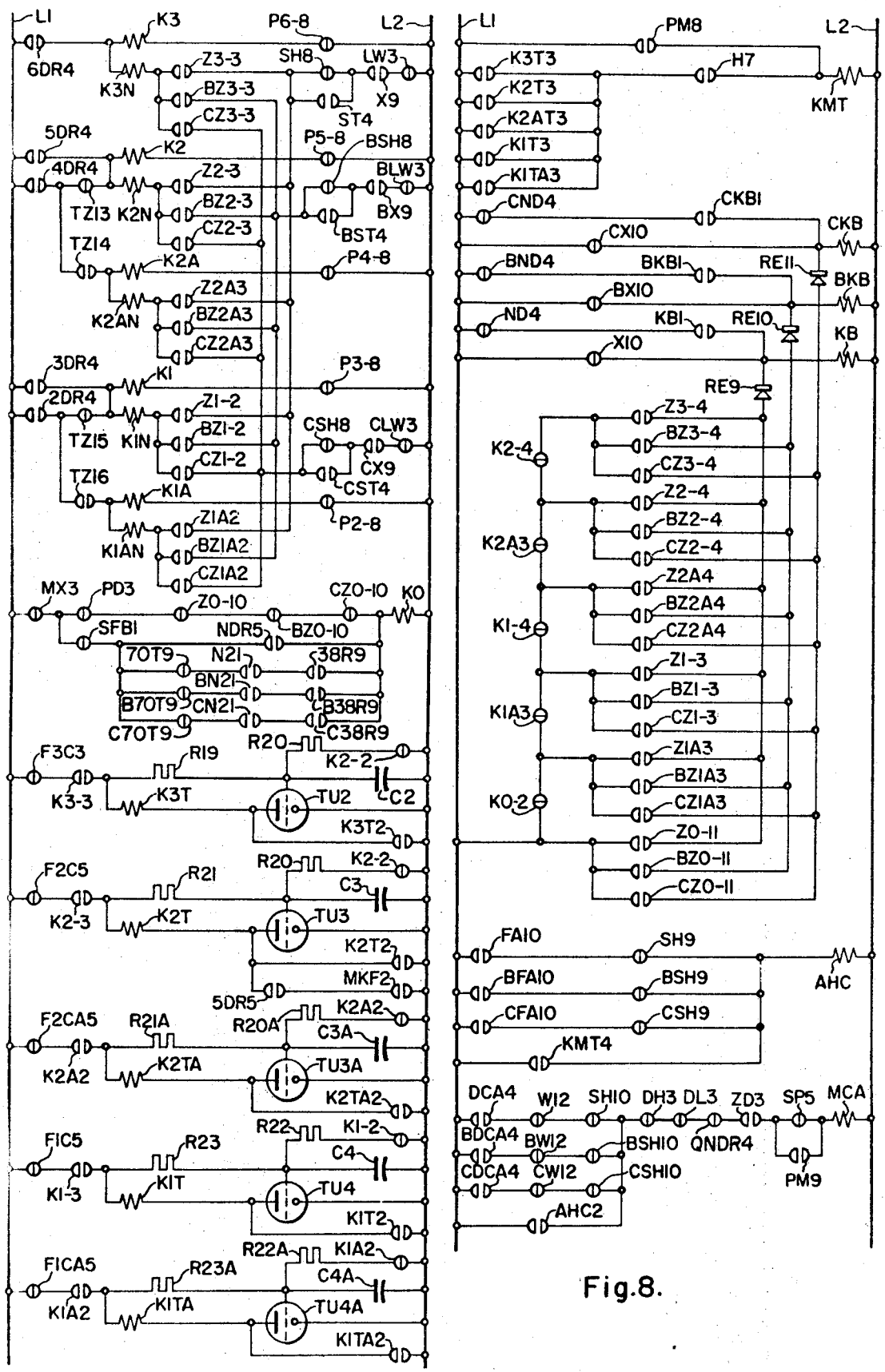

FIG. 8 differs from FIG. 8 of our aforesaid reference patent application by the addition in shunt across the contacts NDR5 of a similar circuit for each of the cars. Thus, for the car A, the shunting circuit has in series break contacts 70T9 of the non-interference relay, make contacts N21 of the next relay N, and make contacts 38R9 of the car call above relay. FIG. 8 also differs by the addition of break contact QNDR4 of the main floor expediting relay QNDR in series with the coil of the master down call above relay MCA.

Figure 9:
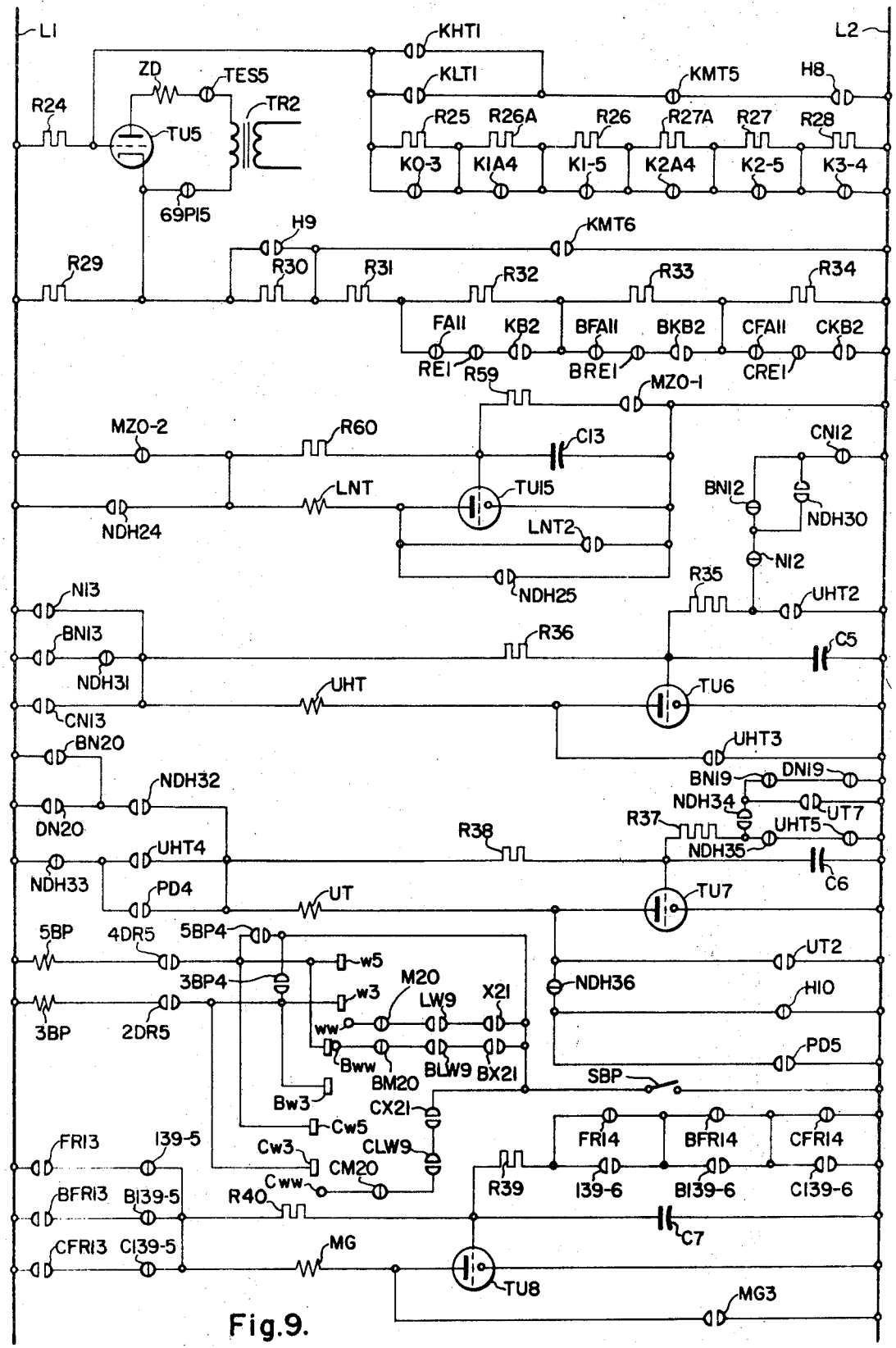

In FIG. 9 a separate resistor associated with the down zone demand relay ZD is controlled by each of the cars. For example the resistor R32 is controlled by the car A. Except for the control of these resistors, FIG. 9 is similar to FIG. 9 of our aforesaid reference patent application. For the car A, break contacts RE1 open to assure effectiveness of the resistor R32 in the bridge circuit under conditions which will be discussed below. Similar contacts BRE1 and CRE1 are shown for the cars B and C.

Figure 10:
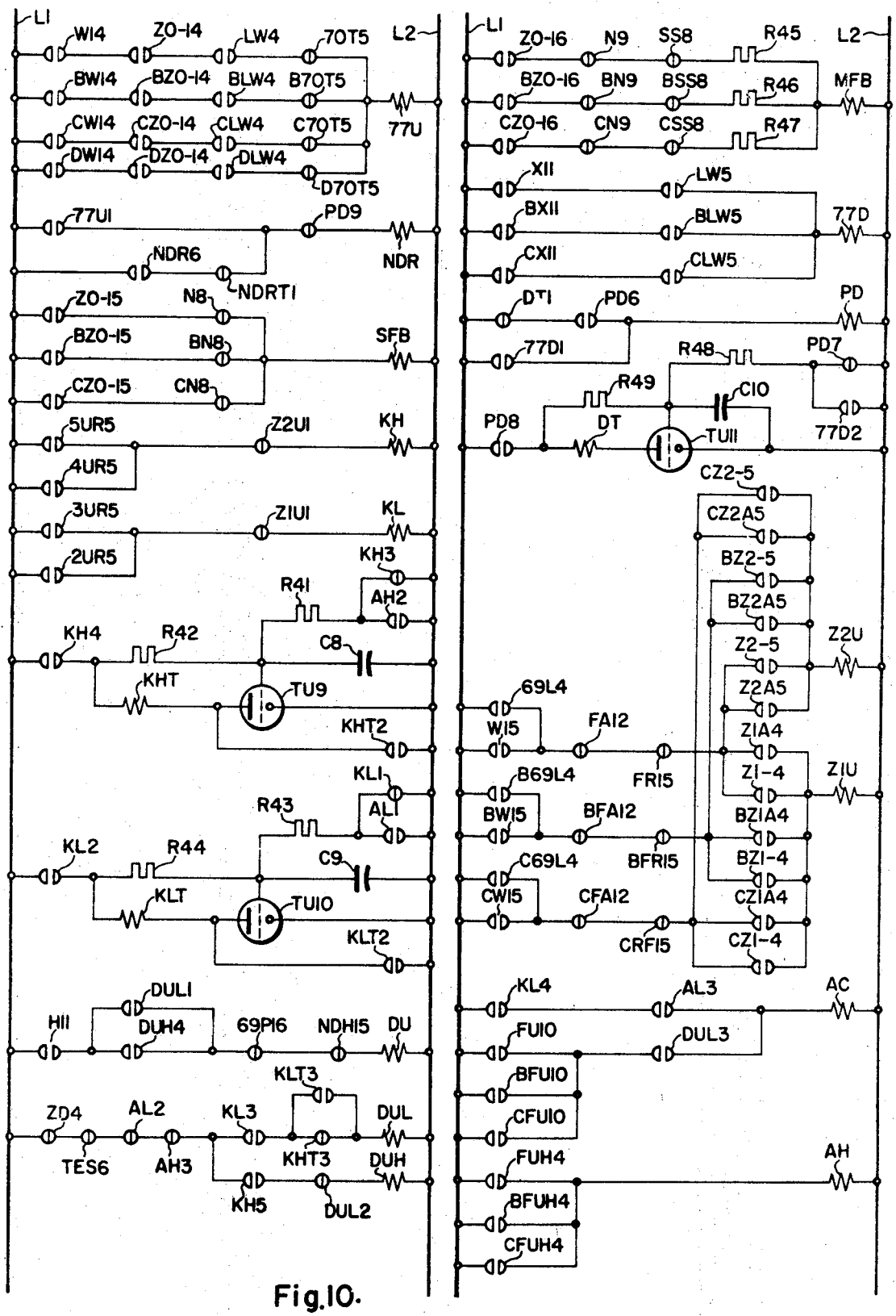

FIG. 10 differs from FIG. 10 of our aforesaid reference patent application by modifying the holding circuit for the no demand return relay NDR. This holding circuit now includes in series only the contacts PD9 and NDR6 of our aforesaid patent application and break contacts NDRT1 of a timing relay NDRT. The break contacts NDRT1 open a predetermined time after the relay NDR picks up. The timing relay is reset for each departure of a car from the main floor at least two-thirds full. A further difference resides in the omission here of the contacts NDH14 which established an alternate energizing circuit in our prior application for the relay NDR.

Figure 11:
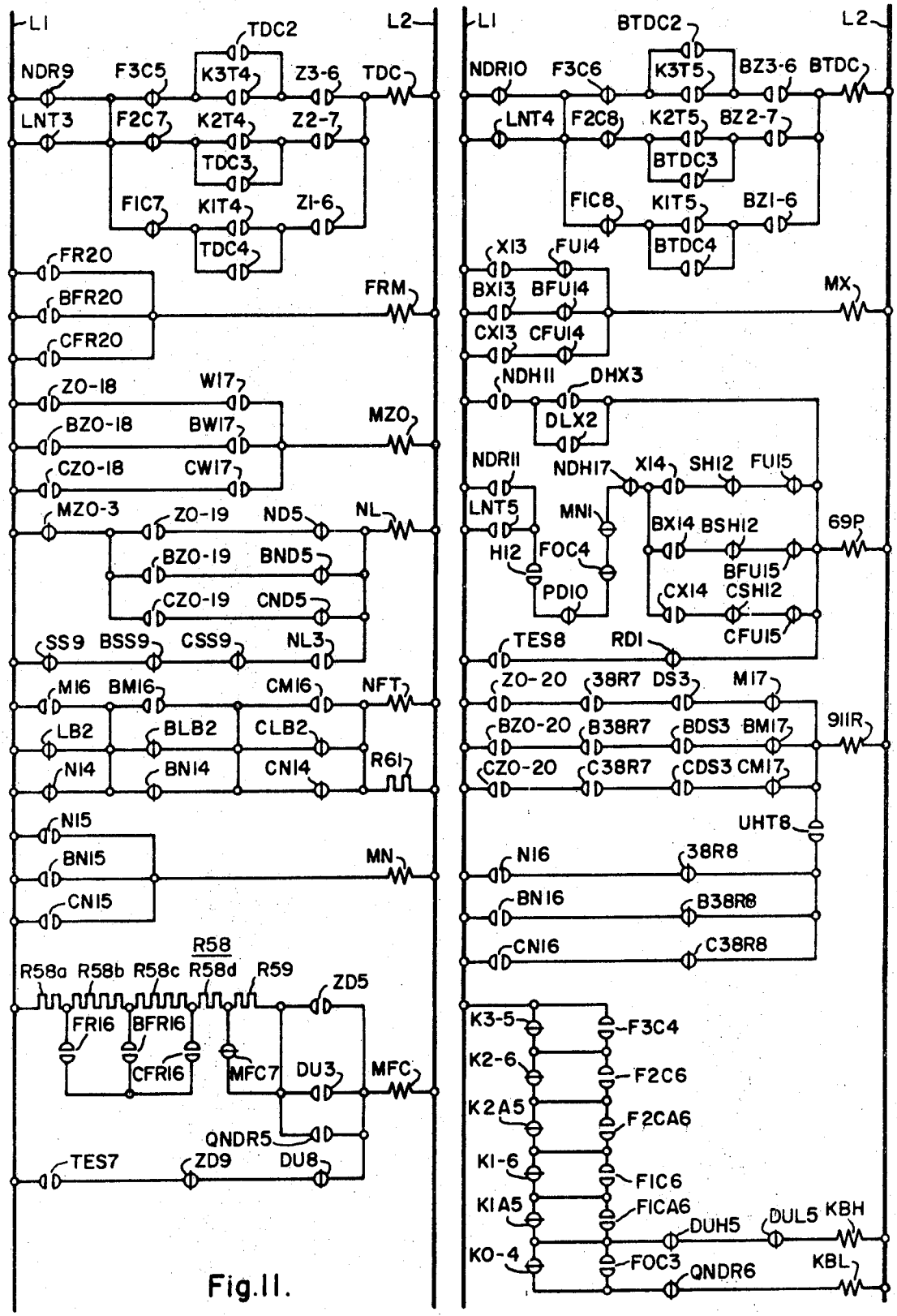

FIG. 11 differs from FIG. 11 of our above-mentioned reference patent application by the addition of make contacts QNDR5 of the main floor expediting relay QNDR which are connected across the contacts DU3 in the circuits associated with the coil of the multiple available car relay MFC.

The connection of the coils of the high zone demand relay KBH and the low zone demand relay KBL to the chains of relay contacts K0–4 to K3–5 and F0C3 to F3C4 has been altered. In the present case the relay KBL is connected between the bus L2 and the lower ends of the chains through the break contacts QNDR6 of the main floor expediting relay QNDR. The relay KBH is connected in series with the break contacts DUL5 of the low up zone demand relay DUL and the break contacts DUH5 of the high up zone demand relay DUH between the bus L2 and the junction between the contacts F1CA6 and F0C3.

Figure 12:
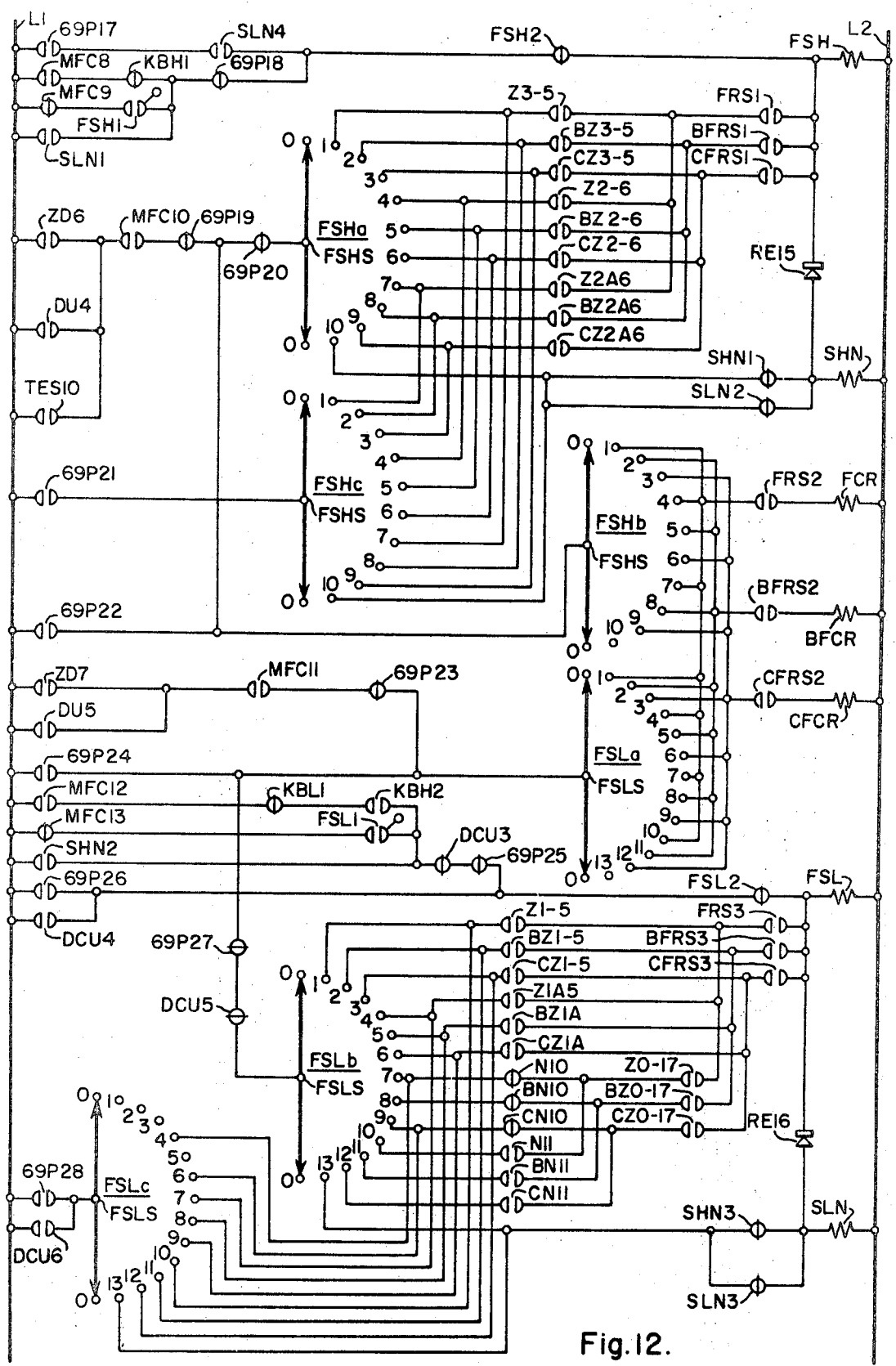

FIG. 12 is similar to FIG. 12 of our aforesaid reference patent application except for the addition of break contacts DCU3 and DCU5 in series respectively with the contacts 69P25 and 69P27. Also make contacts DCU4 and DCU6 are added across the contacts 69P26 and 69P28 respectively. The purpose of these added contacts will be discussed beow.

Figure 15:
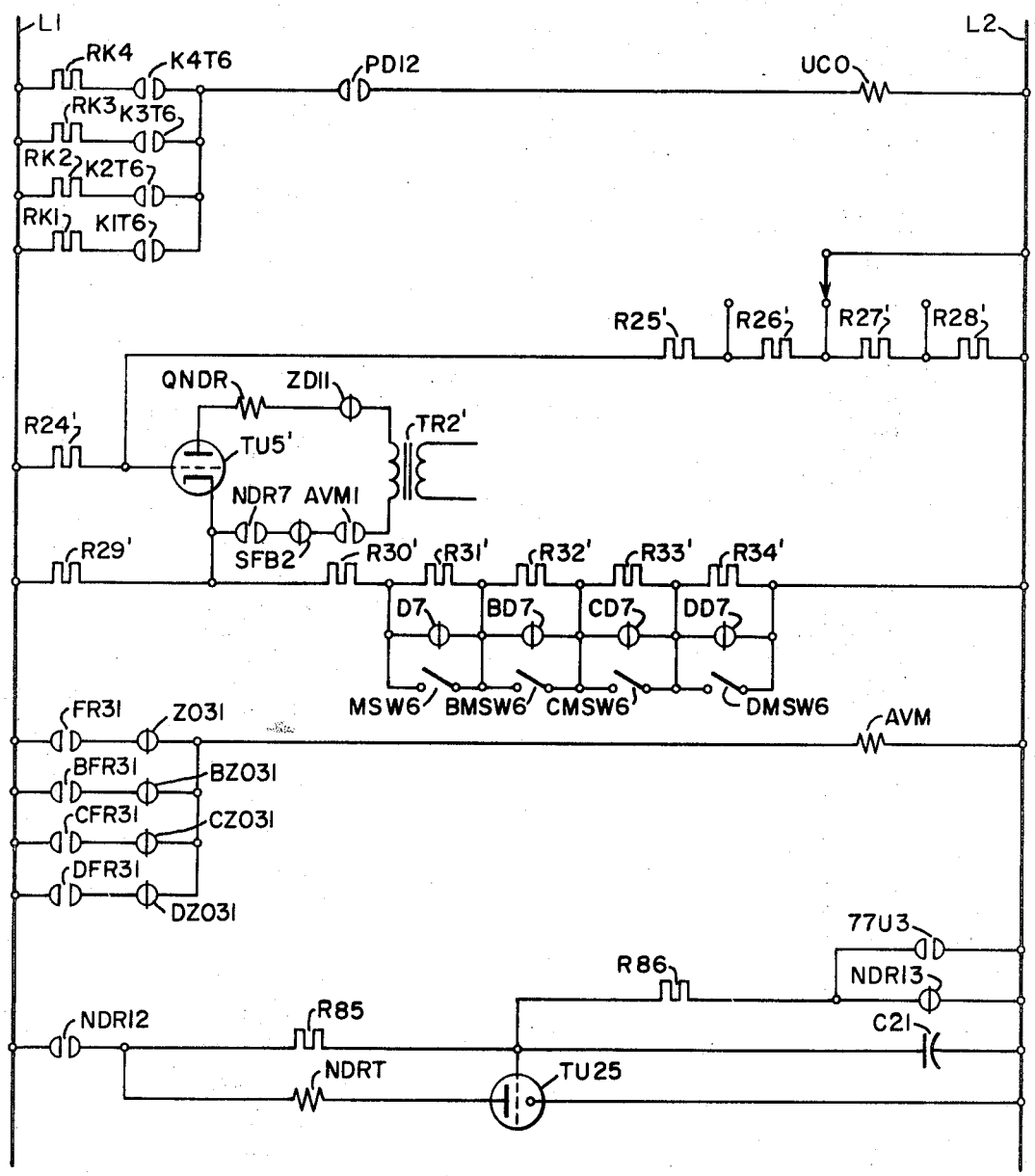

FIG. 15 shows circuits for the down wait quota relay UCO. The coil of this relay is connected across the buses L1 and L2 through make contacts P$d$12 of the instant dispatch relay PD and through four circuits each including a resistor RK1 to R1K4 which may be connected in parallel by make contacts K1T6 to K4T6 respectively of the down zone timing relays. The relays K1T to K3T are similar to the timing relays bearing the same reference character in my above-mentioned reference patent application for the three down zones therein shown. The relay K4T is similar to the relays K1T to K3T and would be available for a fourth higher down zone in a similar manner if such a zone were required. The instant dispatch relay PD is similar to the relay bearing the same reference character in my above-mentioned reference patent application except that an additional set of make contacts PD12 is provided in the present case. The relay UCO may be designed to pick up when energized through a selected number of the resistors RK1 to RK4 and to drop out when the number of energizing resistors decreases below a predetermined value. For exemplary purposes, it will be assumed that the relay UCO is picked up when energized through at least two of the resistors representing at least two timed-out down zone demands and is dropped out when energized through less than two of the resistors.

FIG. 15 also shows circuits for the main floor expediting relay QNDR. Resistors R24' to R34', tube TU5' and transformer TR2' are similar to components bearing the similar reference characters except for the primes which appear in FIG. 9 of our aforesaid reference patent application and the resistors are arranged similarly in a bridge circuit for controlling the tube TR5'.

The purpose of the bridge in the present case is to compare with a preselected quota the number of cars running down. The quota is determined by the number of resistors R25' to R28' which are left effective by an adjustable shunting tap TA. In the illustration the tap shunts two resistors leaving effective only resistors R25' and R26' to establish a quota of two. For a quota of three the tap TA would be moved one step to the right to render effective the three resistors R25' to R27'.

Each of the cars in service and running down renders effective one of the resistors R31' to R34'. Thus, if the car A is in service a manually-operable switch MSW6 across the resistor R31 is open. If in addition the car A is running down a set of break contacts D7 is open and the resistor R31' is effective in the bridge circuit. The contacts D7 are added to the down switch D of our above-mentioned reference patent application. In a similar manner the effectiveness of each of the resistors R32', R33' and R34' is controlled respectively for the cars B, C and D.

As shown in FIG. 15 an output circuit is connected across the anode and cathode of the tube TU5' which includes in series the coil of the main floor expediting relay QNDR, break contacts ZD11 (added to a relay corresponding to the down zone demand relay ZD of our above-mentioned reference patent application), the secondary of the transformer TR2', make contacts AVM1 of a relay AVM (these contacts close when there is an available car away from the first or main floor), break contacts SFB2 which are closed if there is no non-next car at the first floor, and make contacts NDR7 which are added to the no demand return relay NDR.

FIG. 15 next shows circuits for the main available car relay AVM. This relay is energized through a separate circuit for each of the cars. Thus, if the car A is available (make contacts FR31 are closed) and away from the first floor (break contacts Z031 are closed) the relay AVM is energized and picked up. A similar energizing circuit is provided for each of the other cars.

Finally, FIG. 15 shows circuits for the timing relay NDRT. When make contacts NDR12 of the no demand return relay NDR close a capacitor C21 is charged from the buses L1, L2 through a resistor R85. When the voltage across the capacitor reaches a predetermined value representing the lapse of a predetermined time, the thyratron tube TU25 fires to pick up the timing relay NDRT. When the contacts NDR12 open, the timing relay NDRT drops out. At this time break contacts NDR13 close to discharge the capacitor C21 through a discharge resistor R86. Should make contacts 77U3 of the up by-pass relay 77U close, an alternate discharge circuit for the capacitor C21 is established through the resistor R86 to prevent firing of the tube TU25.

Figure 16:
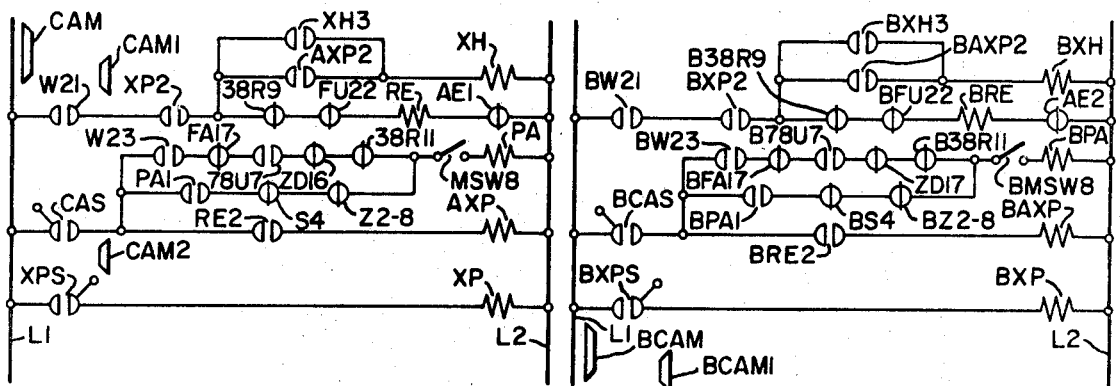

FIG. 16 shows circuits for the service zone relay XH, the express zone selectable car relay RE, the special parking relay PA, the express zone relay XP and the express zone position relay AXP for the car A together with circuits of similar relays for the car B.

For the service zone relay XH to be picked up the car A must be traveling up (make contacts W21 are closed) in the express zone (make contacts XP2 are closed) near the upper end of an express zone while conditioned to become available (make contacts AXP2 are closed). When it picks up, relay XH closes and holds through contacts XH3 connected around the contacts AXP2.

For the express zone selectable car relay RE to be picked up, the car A must be traveling up (make contacts W21 are closed) in the express zone (make contacts XP2 are closed) with no car call registered (break contacts 38R9 are closed) while not assigned to answer an up demand (break contacts FU22 are closed) and while no car is available other than at the main floor (break contacts AE1 are closed).

If the manually-operable switch MSW8 is closed, the special parking relay PA is picked up if the car A is within a predetermined distance below the upper end of the express zone (switch CAS is closed), is traveling up (make contacts W23 are closed), it is not assigned to answer a down call (break contacts FA17 are closed), there is no up floor call above the car A, there is no down zone demand (break contacts ZD16 are closed) and there is no car call in the car A for a floor above the car (break contacts 38R9 are closed).

When the relay PA picks up it establishes a self-holding circuit through the switch CAS, its make contacts PA1, break contacts S4 of the floor call stopping relay S, and break contacts of the zone position relay Z2–8.

For the express zone position relay AXP to be picked up the car A must be located a predetermined distance from the upper end of an express zone (cam-operated switch CAS must be closed) while selectable (make contacts RE2 are closed).

The express zone relay XP is picked up as long as the car A is in an express zone (cam-operated switch XPS is operated from closed to open condition or from open to closed condition for each operation by one of its cams. Thus the switch is closed by its upper cam CAM1 as the car enters its express zone and remains closed until the lower cam CAM2 reopens the switch as the car nears the lower terminal floor and leaves the express zone). As the car reenters the express zone the lower cam CAM2 recloses the switch XPS, and as the car again leaves the express zone the upper cam CAM1 reopens the switch XPS.

Figure 17:
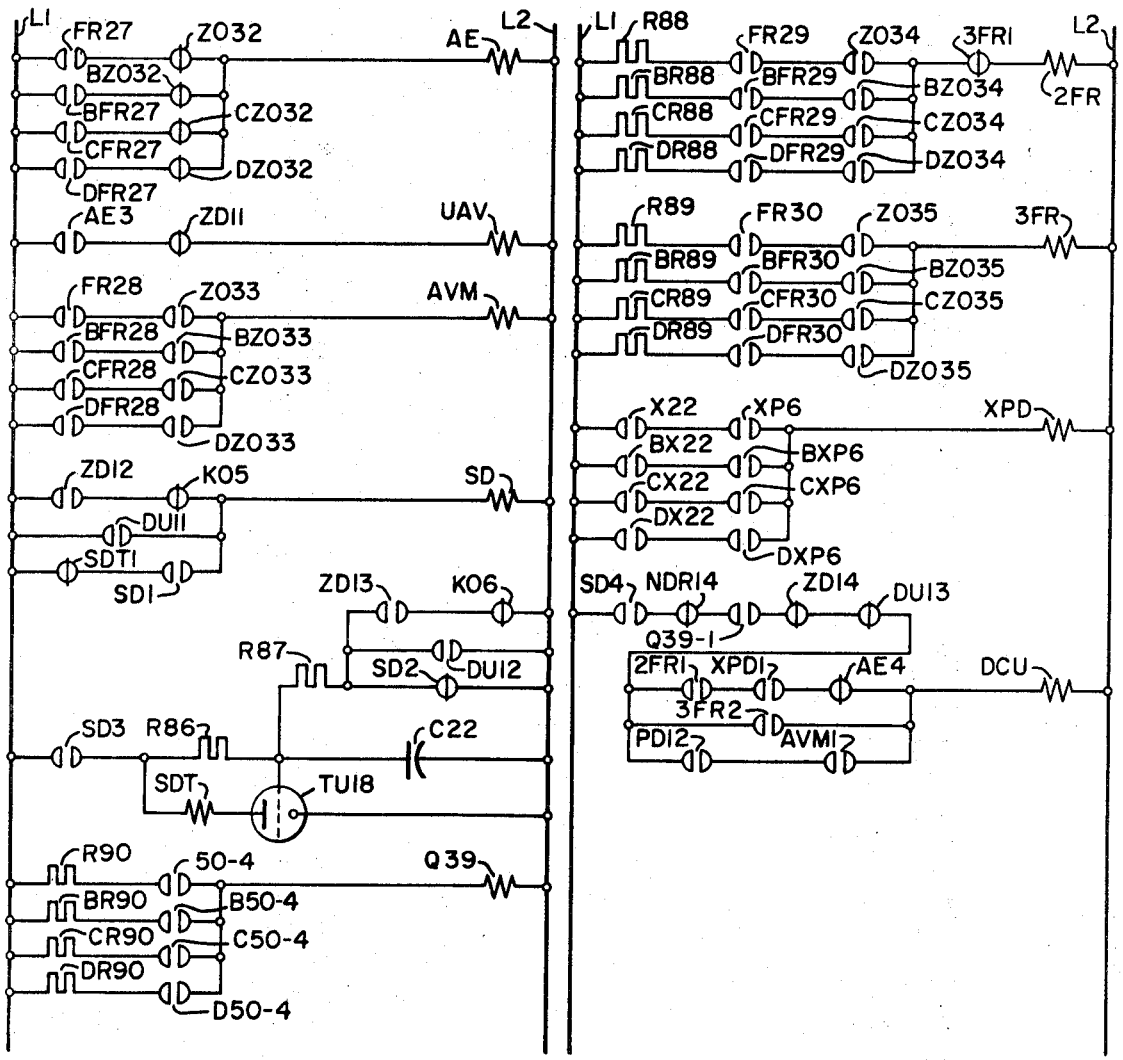

FIG. 17 shows circuits for a car away relay AE, an away available car relay UAV, a main floor available car relay AVM, an upper demand relay SD, an auxiliary timing relay SDT, a double availablility relay 2FR, a treble availability relay 3FR, an express down relay XPD, a master dispatch relay DCU and a plural MG relay Q39.

The car away relay AE is picked up if any of the cars, when available, is away from the main floor. For example, when the car A is away from the main floor (make contacts ZO32 are closed) and is available (make contacts FR27 are closed) an energizing circuit is completed for the relay AE.

The away available car relay UAV is picked up when an available car is away from the main floor (make contacts AE3 are closed) and no down demand exists (contacts ZD11 are closed).

The main floor available car relay AVM is picked up when any available car is at the main floor. For example, an energizing circuit for this relay is completed if the car A is at the main floor (make contacts ZO33 are closed) and is available (make contacts FR28 are closed).

The special demand relay SD is picked up when an up demand is registered (make contacts DU11 are closed), or when a down demand has been registered (make contacts ZD12 are closed) while no artificial demand exists for the first floor under certain conditions (break contacts K05 are closed). When it picks up this relay SD establishes a self-holding circuit through its make contacts SD1 and break contacts SDT1 of a timing relay SDT.

The timing relay SDT is generally similar to other tube-type timing relays shown in the drawings, such as the relay K3T. When the make contacts SD3 close a capacitor C22 charges through a resistor R86 until the voltage across the capacitor becomes sufficient to fire a thyratron tube TU18. This picks up the relay SDT a predetermined time after closure of the contacts SD3. A discharge circuit through a resistor R87 is established by break contacts SD2, or by make contacts DU12, or by make contacts ZD13 in series with break contacts K06.

The double availability relay 2FR is arranged to be energized through the break contacts 3FR1 of a treble availability relay upon completion of any one of several circuits, one for each of the cars. Thus, for the car A, the completing circuit has in series a resistor R88, make contacts FR29 of the available car relay FR and make contacts ZO34 of the zone position relay for the first floor. The relay 2FR picks up only when energized through at least a predetermined number of the resistors R88, BR88, CR88 and DR88, assumed to be two for present purposes.

The treble availability relay is arranged to be picked up only when energized by at least a predetermined number of resistors in parallel, assumed to be three for present purposes. Thus, for the car A, an energizing circuit for the relay 3FR is completed through a resistor R89, make contacts FR30 of the available car relay FR and make contacts ZO35 of the zone position relay ZO.

When any of the cars travels down in an express zone the express down relay XPD picks up. Thus, for the car A an energizing circuit for the relay XPD is established by make contacts X22 of the down preference relay X and make contacts XP6 of the express zone relay XP.

To be picked up, the master dispatch relay DCU requires closures of the make contacts SD4 of the special demand relay SD, break contacts NDR14 of the no demand return relay NDR, make contacts Q39-1 of the plural MG relay, break contacts ZD14 of the down zone demand relay ZD, break contacts DU13 of the up zone demand relay DU. In addition one of three circuits must be completed. The first circuit contains in series make contacts 2FR1 of the double availability relay 2FR, make contacts XPD1 of the express down relay XPD, and break contacts AE4 of the car away relay. The second circuit contains make contacts 3FR2 of the treble availability relay. The third circuit contains in series contacts which close in the presence of a down peak, represented by contacts PD12 of the instant dispatch relay PD, and make contacts AVM1 of the main floor available car relay AVM.

The plural MG relay Q39 is designed to be picked up if at least a predetermined number of cars have MG sets in operation. Thus, the relay is energized through four circuits in parallel, one for each car. The circuit for the car A contains in series a resistor R90 and make contacts 50-4 of the motor-generator starting relay 50. As an example, the relay is picked up if energized through at least two of the resistors and is dropped out if energized through less than two of the resistors.

Figure 18:
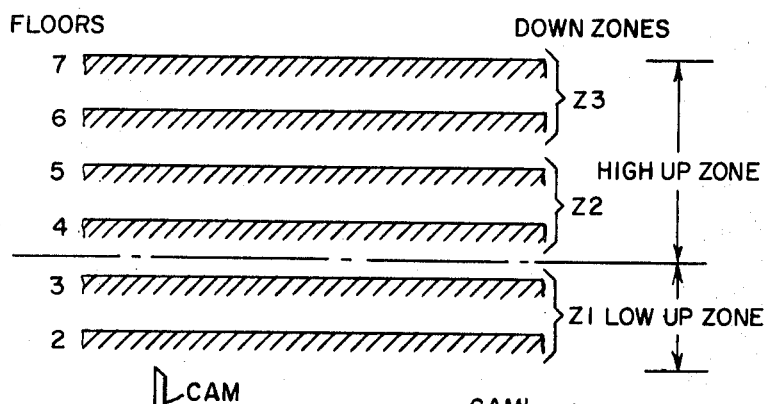
FIG. 18 is a schematic view in elevation of a portion of the elevator system of FIGS. 1–17.
Figure 18:
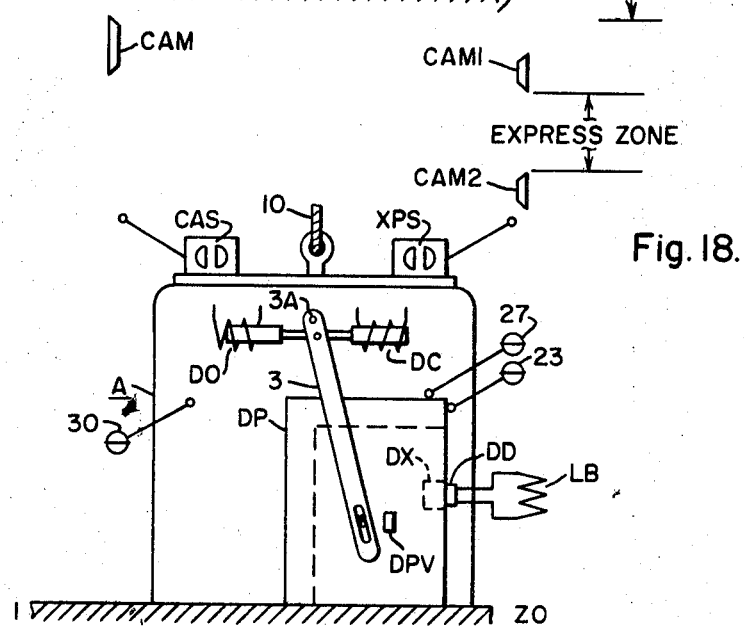

In some installations an elevator car may run through a long express zone without stopping. This is illustrated in FIG. 18 by a large spacing between the first and second floors. As an example, the second floor served by the elevator car of FIG. 18 may correspond to the twenty-fourth floor of an office building and the car may run express from the first to such twenty-fourth floor.

In FIG. 18 the elevator car A corresponds to the car A of our aforesaid reference patent application except for the mounting thereon of cam-operated switches CAS and XPS.

The switch CAS is operated by a cam CAM located in the hoistway adjacent the upper end of the express zone. As the car travels up in the express zone the cam-operated switch CAS remains open until the car nears the end of the express zone. During this travel the car is not available for assignment. When the car reaches a predetermined distance from the second floor sufficient to permit the car to stop at such floor, the cam-operated switch engages its cam CAM and is operated to closed condition. This indicates that the car has reached a position wherein it is available for assignment.

As the car reaches a position from which it cannot stop at the second floor, the cam-operated switch CAS leaves the cam CAM and the switch reopens to indicate that the car has passed the range of positions wherein it is available for assignment.

When the car is above the express zone the cam-operated switch XPS is open. Each cam operation of the switch changes its state between opened and closed conditions. As the car enters the express zone, the switch XPS engages its cam CAM1 located in the hoistway, and is operated to its closed condition. This switch remains closed as long as it is located between its upper cam CAM1 and its lower cam CAM2, these cams being located at the ends of the express zone. When the car is away from the express zone in either side the switch CAS is open. Thus when closed the switch XPS indicates that the car is in the express zone.

OPERATION 1

Car call in only car at street floor starts an available car

For the first operation it will be assumed that the car A is the only car at the first floor and thus is selected as the next car to be loaded (the next car relay N is picked up). The car B is assumed to be at the third floor and is available (the available car relay BFR is picked up). It is further assumed that a car call is registered in the car A for the fifth floor (the car call registering relay 5CR is picked up), that no car is traveling down, and that the car A has been at the first floor long enough for its timer or non-interference relay 70T to time out.

For these conditions in one of our earlier systems, the car B could not start down until the car A had actually left the first floor. This delayed the car B by the times required for loading passengers, for door closure and for starting the car A.

According to our present invention, for the assumed conditions the registration of the car call in the car A immediately starts down an available car (assumed to be the car B). The sequence by which this occurs will now be considered.

The pick up of the car call registering relay 5CR (FIG. 3) results in closure of the make contacts 5CR2 (FIG. 4) to pick up the car call above relay 38R. The latter relay closes its make contacts (FIG. 8) to complete the following energizing circuit:

L1, MX3, SFB1, 70T9, N21, 38R9, K0, L2. Under the assumed conditions, no car is traveling down (contacts MX3 are closed) and only one car is at the first floor (contacts SFB1 are closed). The down zone demand registering relay K0 picks up to register a demand for a car at the first floor and promptly starts an available car (assumed to be the car B) down to the first floor in the same manner as in our aforesaid reference patent application.

The starting of the car B thus is not delayed by the times necessary to complete the loading, the door closing and the starting of the elevator car B.

OPERATION 2

Demand at street floor starts quota of available cars

For the second operation it will be assumed that the car A is the only car at the street floor and that it becomes loaded in exces of a predetermined loading, that the cars B and C are available at the third and fourth floors respectively, and that no car is traveling down.

For these conditions in one of our earlier systems a car was expedited to the first floor, but its return would be delayed by any stops made in response to registered car calls.

According to our present invention a quota of available cars are started down. If one or more cars are traveling down at the time of such excess loading, preferably a number of available cars equal to the quota minus the number of down traveling cars is started down. If a car additional to the "next" car is available at the street floor, or if a down zone demand exists, preferably no available car is started down.

Turning now to the initial assumptions under this Operation 2, the main floor expediting relay QNDR is adjusted as shown in FIG. 15 to pick up if no down zone demand exists (contacts ZD11 are closed), an available car is away from the first floor (contacts AVM1 are closed), there is no non-next car at the first floor (contacts SFB2 are closed), service is to be expedited for the first floor (contacts NDR7 are closed), and less than the quota (assumed to be two) of cars are traveling down (less than two of the resistors R31'–R34' are effectively in circuit). These conditions are all assumed to be present and the relay QNDR therefore picks up.

Referring to FIG. 5, the pick up of the main floor expediting relay QNDR picks up the down call above relay of each available car, in this case cars B and C, to permit such car to reverse for down movement towards the street floor regardless of the registration of a down call above such car. Under the assumed conditions, the car B is available and the make contacts BFR32 are therefore closed. Upon closure of the contacts QNDR2 the following circuit is completed:

L1, QNDR2, BFR32, BRE2, BRE3, Bn3, Bnn, BDCA, L2. A similar circuit is completed for the available car C.

Under the assumed conditions the relay MCA (FIG. 8) is dropped out by the pick up of contacts QNDR4, and contacts MCA1 (FIG. 7) are closed. The master zone relay FZM is dropped out and contacts FZM3 are closed. Therefore, the pick up of the main floor expediting relay closes contacts QNDR3 to complete an energizing circuit for the no scan relay RNS.

Although the starting of the car from this stage on is similar to that in our above-mentioned reference patent application, a brief review of a portion of the starting sequence may be helpful. In picking up, the no scan relay RNS closes make contacts RNS1A (FIG. 4) to complete a pick up circuit for the down call assigned relay BFA. The latter relay operates in its normal manner and closes its contacts BFA4 to complete with the contacts BDCA1 and BX6 an energizing circuit for the high call reversal relay B69H.

The down call assigned relay BFA also opens its break contacts BFA3 to deenergize the available car relay BFR and closes its make contacts BFA7 to energize the first auxiliary running relay BRA through the break contacts B42–2.

The relay BRA closes its make contacts BRA1 to complete with the contacts B70T1 an energizing circuit for the second auxiliary running relay B80. The resulting closure of the make contacts B80–1 (FIG. 1) prepares the down switch BD and the running relay BM for subsequent energization upon pick up of the door relay BDS. When energized the down switch BD and the running relay BM start the car B down in the same manner as in our above-mentioned reference patent application.

Closure of the make contacts QNDR5 (FIG. 11) renders the multiple available car relay MFC energizable through effective portions of the resistor R58 even though no up or down zone demand for service exists (contacts DU3 and ZD5 are open). Inasmuch as the cars B and C are assumed to be available, the relay MFC is picked up.

Opening of the break contacts QNDR6 renders the low zone demand relay KBL ineffective.

In FIG. 15, closure of the make contacts NDR12 and opening of the break contacts NDR13 starts the charging of the capacitor C21. At the end of a predetermined period, such as two minutes, the auxiliary timing relay NDRT picks up and opens its break contacts NDRT1 (FIG. 10) to drop out the no demand return relay NDR. Thus, the relay NDR remains picked-up for a time determined by the selected period, assumed to be two minutes.

Each time the relay NDR drops out it resets the auxiliary timing relay NDRT. Thus the full time delay is available for each pick up of the relay NDR. Also each time a car is loaded in excess of a predetermined value at the first floor for up travel the up by-pass relay 77U closes its contacts 77U3 to discharge the capacitor C21. Thus upon each departure of such a loaded car the auxiliary timing relay NDRT is reset to measure its full timing period even though the relay NDR has not dropped out.

From the foregoing discussion, it is clear that under the assumed conditions the cars B and C are started towards the street floor.

Let it be assumed next that at the time the car A became loaded at the street floor, the car D was traveling down. Referring to FIG. 15, the make contacts DD7 of the down switch are open and the resistor R34' is effectively in the bridge circuit. Under these circumstances the main floor expediting relay QNDR picks up for the reason that the relay has a quota of two and only one of the resistors R31'–R34' is effectively in circuit.

Let it be assumed that the available car B is the first to be reversed for travel to the street floor. As a result of such reversal the switch BD7 opens to place the resistor R32' effectively in circuit. Inasmuch as two resistors R32' and R34' are now effective the relay QNDR drops out and the available car C remains available at the fourth floor.

This illustrates how the system starts down a number of available cars equal to the quota of the relay QNDR less the number of cars traveling down when the car A becomes loaded above a predetermined degree at the first floor.

Next let it be assumed that the car A becomes loaded beyond the predetermined loading at the first floor while the cars B and D are available at the third and fourth floors respectively, but that the car C is also at the first floor.

Referring to FIG. 10, the lower terminal next relay CN has its break contacts CN8 closed and the presence of the car C at the first floor closes the make contacts CZ015 of the zone position relay Z0 to complete an energizing circuit for the lower terminal non-next relay SFB. As a result, the contacts SFB2 in FIG. 15 open to prevent pick up of the main floor expediting relay QNDR.

This shows how the presence of a non-next car prevents starting down of additional cars even though the car A is loaded.

Let it be assumed next that at the time the car A becomes loaded a down zone demand exists for the second zone. Because of the zone demand, contacts ZD11 (FIG. 15) of the down zone demand relay ZD are open, and the relay QNDR cannot pick up to start cars down to the first floor until the down zone demands have been satisfied.

OPERATION 3

Cars ignore false calls

The system herein disclosed gives preference to timed-out down floor calls. This minimizes any interference with efficient operation by some intending passengers who press up floor buttons when they desire to go down, particularly during down peaks.

To improve still further the efficiency of the system when a substantial demand for down service is present, a car is prevented from answering up floor calls even though the car is traveling up and has registered car calls for floors ahead of the car. After it has answered the last car call the car becomes available even though up floor calls are registered for floors above the car.

In order to illustrate this operation it will be assumed that while traveling down (contacts BX11 are closed in FIG. 10) the car B becomes loaded sufficiently to close the contacts BLW5 and thus pick up the down by-pass relay 77D. This results in pick-up of the instant dispatch relay PD to indicate the presence of a substantial down demand. At the same time, it is assumed that the car A is traveling up adjacent the second floor and that it has a car call registered for the fourth floor (car call registering relay 4CR in FIG. 3 is picked up). At this moment an intending passenger at the third floor, desiring to go down, presses the up floor button 3U (FIG. 2) to pick up the up floor call registering relay 3UR. This opens the break contacts 3UR2 (FIG. 3) to drop out the up call above relay 78U. Let it also be assumed that there is an up corridor call registered at the fifth floor (contacts 5UR2 are open).

It is assumed further that demands for down service in the second and third down zones have been registered for more than forty seconds (relays K2T and K3T in FIG. 8 are picked up).

Under the assumed conditions, in FIG. 15 contacts K2T6, K3T6 and PD12 are closed to indicate a substantial demand for down service, and the down wait quota UCO relay is picked up. It will be recalled that this relay is assumed to pick up when energized through two or more of the resistors RK1–RK4.

When it picks up, the relay UCO opens its break contacts UCO1 (FIG. 2) to prevent response by the car A to the registered up floor call for the third floor. Similar contacts of this relay are provided for each of the cars.

In addition the make contacts UCO3 (FIG. 4) are closed to permit energization of the available car relay FR even though the make contacts 78U3 are open to indicate that an up floor call is registered above for the fifth floor.

Th car A thus passes the third floor and stops at the fourth floor in answer to its registered car call. As the car A stops at the fourth floor, the car call registering relay 4CR is reset and opens its make contacts 4CR2 (FIG. 4). The opening of these contacts drops out the car call above relay 38R which closes its break contacts 38R2 to permit energization of the available car relay FR therethrough if the other requirements for energization are satisfied.

The car A can now be assigned to answer the calls in the timed-out third down demand zone. The by-passing of the up floor call and the ignoring of the up floor call at the fifth floor has expedited this assignment of the the car A.

OPERATION 4

Express zone

As an example of express-zone operation, it will be assumed that the manually-operated switches MSW1 (FIG. 4) MSW3, MSW4 (FIG. 6) for the car A, and similar switches for the other cars, are closed, that switches MSW2 (FIG. 4) MSW5 (FIG. 6) for the car A and similar switches for the other cars, are open, that the cars are all at the first floor in FIG. 18, that a down floor call is registered for the second floor which is located immediately above the express zone and that the car A is assigned (relay FA is picked up) to the down demand zone Z1 which includes the second floor.

Inasmuch as no car is available at a position above the first floor the zone position relays Z0, BZ0, CZ0 and DZ0 are picked up and the car-away relay AE (FIG. 17) is dropped out. The treble availability relay 3FR is picked up and the double available relay is dropped out. The express zone relay XP and the express zone position relay AXP are dropped out.

The car A, being assigned to the down demand, now leaves the first floor. As the car leaves the first floor, the zone position relay Z0 drops out to close its break contacts Z032 (FIG. 17). However, the available can relay contacts FR27 remain open and the car away relay AE remains dropped out. Also the cam CAM2 engages the switch XPS to close the switch and pick up the experss zone relay XP which opens its break contacts XP1 (FIG. 4) to drop out the down call assigned relay FA (the switch MSW2 and the contacts XH1 are open at this time). Thus the car A loses its assignment when it enters the express zone.

The express zone relay XP also closes its make contacts XP2 (FIG. 16) to pick up the express zone selectable car relay RE. This relay opens its contacts RE1 (FIG. 9) to render the resistor R32 effective even though the contact FA11 are now closed. Therefore, the car A is running up in the express zone with its relay RE picked up is counted by the down zone demand relay ZD as a car that can answer a down demand. This avoids the starting of additional cars from the first floor to answer the assumed down demand.

In dropping out, the zone position relay Z0 opens its make contacts Z033, but the main floor available car relay AVM continues to be energized through the circuits for the cars B, C and D.

Opening of the contacts FR30 and Z035 does not drop out the treble availability relay 3FR for the reason that this relay continues to be energized through the resistors BR89, CR89 and DR89.

As the car A approaches the upper end of the express zone, the cam-operated switch CAP closes to pick up the express zone position relay AXP through the contacts RE2. The relay AXP closes its make contacts AXP1 (FIG. 4) to complete the following circuit:

L1, MSW1, AXP1, FU2, W7, FA3, Z01, FR, L2 to make the car A again available for assignment.

Closure of the make contacts AXP2 (FIG. 16) completes with the contacts W21 and XP2 a circuit picking up the service zone relay XR. As a result, the make contacts XH1 (FIG. 4) close to permit the energization of the down call assigned relay FA even though the contacts XP1 are open.

The pick up of the available car relay FR closes the contacts FR27 to pick up the car away relay AE (FIG. 17). Contacts AE1 (FIG. 16) open to drop out the express zone selectable car relay RE. Contacts RE1 in the circuit of the down zone demand relay ZD (FIG. 9) close and the ZD relay picks up to indicate a down demand since it is assumed that a down call is registered at the second floor (K1A4 contacts are open). The car selection circuits of FIG. 12 operate to select a car, as described in our aforesaid reference patent application. Since the car A is now available and the highest available car, it will be selected in preference to the cars that are available at the main terminal. The FA relay of car A picks up and contacts FA11 (FIG. 9) open to drop out the demand relay ZD.

The car A is now reassigned to serve the down demand. As the car A reaches a position beyond which it cannot stop in time to serve the second floor, the switch XPS is operated to the open position by its cam CAM1 to drop out the express zone relay XP (FIG. 16). Closure of the break contacts XP1 (FIG. 4) maintains the car assignment even though the contacts XH1 subsequently open. Opening of the make contacts XP2 (FIG. 16) drops out the delay XH slightly after the contacts XP1 close.

From the foregoing discussion it is clear that if a first car at the first floor is assigned to answer a down demand above the express zone, and if no car above the express zone becomes available to answer the down demand during the transit of the first car through the express zone, the first car answers the down demand.

If, when the car notching relay ND (FIG. 6) notches into the second floor, the car has no assignment for own demands (contact FA2 are closed, FIG. 2) and there are no up floor calls ahead (contacts 78U1 are closed) the stopping relay S will pick up during the notch (contacts ND1 are closed). Therefore, the car will automatically stop at the second landing and park as an available car.

If it is desirable to park a car at other zones, the circuits may be arranged to stop the car at the desired zone by closing the manually-operable switch MSW8 (FIG. 16).

When the car reaches the position in the express zone where the cam-actuated switch CAS closes, the special parking relay PA will pick up provided: the car is in the up direction (make contacts W23 are closed), it is not assigned to down demands (break contacts FA17 are closed), there are no up floor calls ahead (break contacts 78U7 are closed), there are no down demands (break contacts ZD16 are closed), and there are no car calls registered (break contacts 38R11 are closed). When the relay PA picks up, it is held in through its own make contacts PA1, the stopping relay break contacts S4, and the desired parking zone relay contacts which, in this example, are the break contacts Z2–8 for the second zone position relay Z2. Normally closed contacts PA2 have been added to the circuit of the stopping relay S (FIG. 2). With the contacts PA2 open, this portion of the stopping circuit will be ineffective until the car reaches the second zone (at which time the contacts Z2–8 (FIG. 16) open to drop out the relay PA) or if a car intercepts an up floor call (subsequently registered) at which time the contacts S4 of the stopping relay S open to drop out the relay PA.

Thus a car traveling up from the lower terminal floor may be parked in a zone determined by contacts of a selected zone position relay, such as the contacts Z2–8 in the example here illustrated.

Next let it be assumed that the cars A, C and D are at the first floor and that the car B is traveling up in the express zone with a car call registered for the fifth floor when a down floor call is registerd for the second floor.

It will be assumed that the elevator car A is assigned to answer the down demand for the zone Z1, and that the car proceeds upwardly through the express zone in the same manner previously discussed. It will be recalled that the car A loses its assignment when it enters the express zone.

While the car A is in the express zone with no assignment it is assumed that the car B answers its registered car call and that the available car relay BFR picks up to close its make contacts BFR27 (FIG. 17). Inasmuch as the car B is away from the first floor the contacts BZ032 also are closed to complete an energizing circuit for the car away relay AE.

The car away relay AE opens its break contacts AE1 to drop out the express zone selectable car relay RE. The operation of the remaining contacts of the relay AE has no effect on system operation at this time.

The express zone selectable car relay RE now closes its break contacts RE1 (FIG. 9) to complete a shunting circuit for the resistor R32. This causes the down zone demand relay ZD to pick up, thus reestablishing the down demand. Inasmuch as a down demand exists while the car B is available above the express zone the car B is assigned to answer such down demand.

In the foregoing discussion it has been shown that if a car becomes available above the express zone while a car which had been assigned to answer a down demand is traveling up in the express zone, the down demand will be reassigned to the car above the express zone. This can result in a material saving in the time required to answer the down demand.

Let it be assumed next that when the four cars A, B, C and D are available at the first floor, an up floor call is registered for the second floor, and the car A is assigned to answer the resulting up demand (the up call assigned relay FU of FIG. 6 is picked up). For the assumed conditions the relay FU is energized through the break contacts XP3 of the express zone relay XP in parallel with the break contacts UAV1 of the away available car relay UAV.

As the car A leaves the first floor the cam CAM2 closes the switch XPS to complete an energizing circuit for the express zone relay XP. The resultant opening of the contacts XP3 (FIG. 6) has no immediate effect on system operation for the reason that these contacts are still shunted by the closed contacts UAV1. Consequently, the up call assigned relay FU remains picked up and the car retains its assignment as it travels through the express zone.

As the car A approaches the end of the express zone, the cam CAM closes the switch CAS without immediate effect on system operation. Shortly thereafter the cam CAM1 opens the switch XPS to drop out the express zone relay XP without immediate effect on system operation and the car proceeds to answer the up demand.

Assume next that when the car A entered the express zone under assignment to answer the up demand, the car B was about to stop at the fifth floor in response to a car call. After answering the car call the car B is available (relay BFR is picked up). Inasmuch as contacts BFR27 (FIG. 17) and BZ032 are now closed the car away relay AE picks up to complete with break contacts ZD11 of the down zone demand relay ZD (no down zone demand is present under the assumed conditions) an energizing circuit for the away available car relay UAV which is picked up. This relay UAV opens its break contacts UAV1 (FIG. 6) to drop out the up call assigned relay FU (contacts XP3 and XH1 are open at this time). Under these circumstances the low up zone demand relay DU6 and the up zone demand relay DU (FIG. 10) pick up and the system is free to assign the up demand to an available car above the express zone, in this case the car B.

When the up call assigned relay FU dropped out, it closed its contacts FU22 (FIG. 16) to complete an energizing circuit for the express zone selectable car relay RE.

The car A continues its up travel. As the car nears the end of the express zone, the cam CAM closes the switch CAS to complete an energizing circuit for the express zone position relay AXP. This relay closes its make contact AXP1 (FIG. 4) to complete an energizing circuit for the available car relay FR and closes its contacts AXP2 (FIG. 16) to complete an energizing circuit for the service zone relay XH. The car A now is available for assignment to any other demand which may exist.

In our above-mentioned patent application, the low zone demand relay KBL was intended to drop out in the presence of a down zone demand in the low zone. The low zone was then scanned first for an available car followed by the high zone if no available car was located in the low zone. Although this arrangement could be employed for an express zone system the revision shown in FIG. 10 is preferable.

By inspection of FIG. 11 it will be noted that any unassigned down demand above the first floor (e.g. contacts K1-6 open to show a down demand for say the zone including the third floor) results in drop out of both of the relays KBL and KBH. Under these circumstances scanning for an available car starts from the highest zone down. This eliminates the possibility of selecting an available car at the first floor if a more convenient car is available above the express zone.

The dispatch of a car to park above the express zone now will be considered.

Assume that a down call is registered at the second floor (contacts ZD12 (FIG. 17) are closed) when no demand exists for the first floor (contacts K05 are closed). This establishes an energizing circuit for the special service relay SD.

The special service relay closes its make contacts SD1 to complete with the break contacts SDT1 of the timing relay SDT a holding circuit. In addition, the special service relay SD closes its make contacts SD3 and opens its break contacts SD2 in partial preparation for charging of the capacitor C22. However, under the assumed conditions the contacts ZD13 and K06 are closed to prevent any substantial charging of the capacitor C22.

The foregoing discussion is based on the occurrence of a down demand. If the demand had been occasioned by an up call at the second floor, the contacts DU11 would have closed to pick up the relay SD and the contacts DU12 would have closed to prevent substantial charging of the capacitor C22.

It will be assumed that the three cars A, B and C are at the first floor, and that the car D is available above the express zone when the down demand is registered, and that the car D then is assigned to answer the down demand.

It is assumed that the motor generator sets of the cars A, B, and D are running, and that the motor generator starting relays for these cars are picked up to close their contacts 50-4, B50-4 and D50-4. Thus the plural MG relay Q39 is picked up, and its contacts Q39-1 are closed.

If the available car relays FR, BFR and CFR of the three cars at the first floor are all picked up the treble availability relay 3FR is picked up. This opens the break contacts 3FR1 to prevent pick up of the double availability relay 2FR. In addition, the make contacts 3FR2 close to participate in the operation of the master dispatch relay DCU.

Turning now to the complete circuits for the master dispatch relay DCU, the make contacts SD4 of the special demand relay SD are closed. In addition, there is no up peak condition (the break contacts NDR14 are closed), plural MG sets are running (the contacts Q39-1 are closed), there is no down zone demand (the make contacts ZD14 are closed) or up zone demand (the contacts DU13 are closed), and there are three available cars at the first floor (the contacts 3FR2 are closed). Thus an energizing circuit is completed for the master dispatch relay DCU.

When the master dispatch relay DCU picks up it opens the contacts DCU3 (FIG. 12) and DCU5 and closes the contacts DCU4 and DCU6 to render effective the FSLc level of the low zone stepping switch FSL. The stepping switch through its level FSLc then selects one available car at a time in the same manner as it does when activated by pickup of the closest car relay 69P.

In the present case it will be assumed that the stepping switch first selects the car A by picking up the demand response relay FCR. The relay FCR closes its make contacts FCR6 (FIG. 4). Inasmuch as the switch MSW3, the contacts DCU1 of the master dispatch relay DCU, and the contacts 42-2 are all closed, an energizing circuit is completed for the first auxiliary running relay RA which initiates a starting operation of the elevator car A.

The car A proceeds through the express zone in the manner previously described. If no demand is present during the time that the switch CAS is closed by its cam the car A stops at the second floor as an available car.

In this way all but two available cars at the first floor are dispatched.

As the car A leaves the first floor, the make contacts Z035 (FIG. 17) of the zone position relay Z0 open. The treble availability relay, being energized through only two resistors BR89 and CR89, drops out to close its break contacts 3FR1. This connects the double availability relay 2FR for energization through the resistors BR88 and CR88, and this relay picks up to indicate the presence of two available cars at the first floor.

The treble availability relay 3FR2 also opens its make contacts 3FR2 to drop out the master dispatch relay DCU.

The contacts 2FR1 of the double availability relay 2FR are closed. Also it is assumed that the car D is now traveling down (contacts DX22 are closed) in the express zone (contacts DXP6 are closed). Under such conditions the relay XPD picks up and closes its contacts XPD1. It is also assumed that the elevator car A, which we left at the second floor, has been assigned to answer a down demand in the second zone and is no longer available (contacts FR27 are open). The car away relay AE is now dropped out, and its contacts AE4 are closed to complete the following circuit: L1, SD4, NDR14, Q39-1, ZD14, DU13, 2FR1, XPD1, AE4, DCU, L2.

The master dispatch relay DCU, being picked up, again initiates the selection and starting of one of the cars, say the car B, at the first floor in the same manner previously discussed for the car A.

As the car B is selected and leaves the first floor, the contacts BFR29 and BZ034 open. Inasmuch as the double availability relay no wis energized through only the resistor CR88, it drops out to open its contacts 2FR1 and the master dispatch relay DCU drops out to discontinue its dispatching of cars from the first floor. If no unassigned demand is present during the time that the switch BCAS is closed by its cam, the car B stops at the second floor and is available for assignment.

Let it be assumed next that a down peak situation exists, here represented by closure of the contacts PD12, and that at least one available car is present at the first floor (contacts AVM1 are closed). The master dispatch relay DCU is now energized through the circuit: L1, SD4, NDR14, Q39-1, ZD14, DU13, PD12, AVMl, DCU, L2. Under these circumstances all available cars at the first floor are successively dispatched by the action of the master dispatch relay DCU.

Finally let it be assumed that following the pick up of the special demand relay SD the last down zone demand is assigned (contacts ZD13 open) and that no up zone demand is present (contacts DU12 are open). The capacitor C22 now charges until at the end of two minutes the voltage across its terminals becomes sufficient to fire the tube TU18 and pick up the timing relay SDT, which opens its break contacts SDT1. Inasmuch as the contacts ZD12, DU11 and SDT1 are now all open the special demand relay SD drops out. The relay SD opens its holding contacts SD1, opens its contacts SD3 to drop out the timing relay SDT, closes its contacts SD2 to discharge the capacitor C22, and opens its contacts SD4 to prevent energization of the master dispatch relay DCU.

Although the invention has been described with reference to certain specific embodiments thereof, numerous modifications falling within the spirit and scope of the invention are possible.

We claim as our invention:

1. In a transportation system, a structure having a plurality of spaced landings including a main landing, a plurality of transport vehicles, means mounting each of said vehicles for movement relative to the structure in a path extending adjacent each of said landings, motive means for moving each of said vehicles along its associated path relative to the structure, and control means cooperating with the motive means for moving each of said vehicles relative to the structures and for stopping a moving one of the vehicles at a selected landing, said control means comprising person-operable means responsive to a predetermined operation of a person in each of said vehicles, assigning means responsive to operation of the person-operable means of one of the vehicles only when at the main floor while a plurality of said vehicles are available at positions spaced from the main landing for assigning and starting a plurality of the last-named vehicles to said main landing.

2. A system as claimed in claim 1 wherein the landings are divided into a plurality of zones each containing at least one of said landings, said control means comprising means effective under predetermined conditions for making each of said vehicles available for assignment to any of said zones, said person-operable means including a separate load-weighing device in each of said vehicles, said assigning means being responsive to operation of the load-weighing device of one of the vehicles only when at the main floor while a plurality of said vehicles are available at positions spaced from the main landing for assigning and starting a plurality of the last-named vehicles to said main landing.

3. In an elevator system, a structure having a main landing and a plurality of vertically spaced landings above the main landing, a plurality of elevator cars, means mounting each of said cars for vertical movement relative to the structure to serve said landings, separate motive means for moving each of said cars relative to the structure, and control means cooperating with said motive means to move each of said cars and to stop one of said cars at each of the landings requiring service, said control means comprising down call registering means for each of said spaced landings operable for registering a call for service from the associated landing in the down direction, up call registering means for each of said spaced landings for registering a call for service from the associated landing in the up direction, separate car call registering means for each of said cars operable for registering a call for stopping the associated car for each of the landings, said landings being divided into landing zones each containing at least one of said landings, means responsive to predetermined conditions for making each of said cars available for direct assignment to any of said zones, and main-landing-expediting means comprising load-responsive means in each of the elevator cars for operating from a first to a second condition in response to loading of the associated elevator car in excess of a predetermined value, assigning means responsive to operation of the load-responsive means in one of the elevator cars at the main landing to said second condition when such elevator car is the only car at the main landing for assigning certain of the elevator cars equal in number to a predetermined quota greater than one, and a number less than said quota should certain of said elevator cars be traveling towards the main landing, to proceed to the main landing.

4. In an elevator system, a structure having a main landing and a plurality of vertically spaced landings above the main landing, a plurality of elevator cars, means mounting each of said cars for vertical movement relative to the structure to serve said landings, separate motive means for moving each of said cars relative to the structure, and control means cooperating with said motive means to move each of said cars and to stop one of said cars at each of the landings requiring service, said control means comprising down call registering means for each of said spaced landings operable for registering a call for service from the associated landing in the down direction, up call registering means for each of said spaced landings for registering a call for service from the associated landing in the up direction, separate car call registering means for each of said cars operable for registering a call for stopping the associated car for each of the landings, said landings being divided into landing zones each containing at least one of said landings, means responsive to predetermined conditions for making each of said cars available for direct assignment to any of said zones, and main landing-expediting means responsive to a call registration by the car call registering means in a car when located at the main landing while a car is available at a landing spaced from the main landing for assigning and starting the last-named car to the main landing, separate priority-designating means for each of said down call registering means, each of said designating means being responsive to registration of a call by the associated down call registering means for a predetermined time for operation from the first to a second condition to depict a priority landing, expediting means responsive to operation of said designating means for a landing to assign one of the elevator cars traveling up without registered car calls therefor to ignore a call registered by the up call registering means for a floor approached by such car, said expediting means permitting the last-named car to answer a call registered by the up call registering means for a floor approached by such car if traveling up with a call registered by the car call registering means for such car for a floor ahead, and second expediting means responsive to a predetermined demand for down service for assigning a car traveling up with a call registered by the car call registering means for such car, to ignore a call registered by the up call registering means for a floor approached by such car, assigning means responsive to operation of said designating means for a floor to assign one of the elevator cars when available to stop at the last-named floor, said second expediting means when responding to said predetermined demand for down service being effective for making an up traveling elevator car with a registered car call become available for said assigning means following the answering by the elevator car of its last registered car call regardless of the presence of a call registered by the up call registering means for a floor ahead of the last-named car.

5. In an elevator system, a structure having a main landing and a plurality of vertically spaced landings above the main landing, a plurality of elevator cars, means mounting each of said cars for vertical movement relative to the structure to serve said landings, separate motive means for moving each of said cars relative to the structure, and control means cooperating with said motive means to move each of said cars and to stop one of said cars at each of the landings requiring service, said control means comprising down call registering means for each of said spaced landings operable for registering a call for service from the associated landing in the down direction, up call registering means for each of said spaced landings for registering a call for service from the associated landing in the up direction, separate car call registering means for call of said cars operable for registering a call for stopping the associated car for each of the landings, said landings being divided into landing zones each containing at least one of said landings, means responsive to predetermined conditions for making each of said cars available for direct assignment to any of said zones, and main-landing-expediting means responsive to a call registration by the car call registering means in a car when located at the main landing while a car is available at a landing from the main landing for assigning and starting the last-named car to the main landing, separate priority-designating means for each of said down call registering means, each of said designating means being responsive to registration of a call by the associated down call registering means for a predetermined time for operation from a first to a second condition to depict a priority landing, expediting means responsive to operation of said designating means for a landing to assign one of the elevator cars traveling up without registered car calls therefor to ignore a call registered by the up call registering means for a floor approached by such car, said expediting means permitting the last-named car to answer a call registered by the up call registering means for a floor approached by such car if traveling up with a call registered by the car call registering means for such car for a floor ahead, and second expediting means responsive to a predetermined demand for down service for assigning a car traveling up with a call registered by the car call registering means for such car, to ignore a call registered by the up call registering means for a floor approached by such car, assigning means responsive to operation of said designating means for a floor to assign one of the elevator cars when available to stop at the last-named floor, said second expediting means when responding to said predetermined demand for down service being effective for making an up traveling elevator car with a registered car call become available for said assigning means following the answering by the elevator car of its last registered car call regardless of the presence of the call registered by the up call registering means for a floor ahead of the last-named car, said spaced landings being displaced from the main landing by an express zone having a length substantially longer than the spacing between pairs of said spaced landings, scanning means responsive to a down demand from one of said landing zones above the express zone for scanning for the presence of an available one of the cars starting with the highest landing and proceeding towards the main landing, means responsive to assignment of an available car at the main landing to the last-named landing zone and to the entry of said last-named car into the express zone for cancelling the assignment of such car, reavailability means responsive to the approach of the last-named car to a first position adjacent the end of the express zone for making such car available for assignment, said assigning means, if no available car has been assigned to the last-named landing zone, being effective for reassigning the last-named car to answer the down demand in such landing zone.

6. The system as claimed in claim 5 wherein said reavailability means is responsive to approach the last-named car while available to a second position higher than the first position for terminating the availability of such car, said control means thereupon being effective for stopping and again making available the last-named car at one of the spaced landings, said scanning means being responsive to an up demand from one of the landing zones above the express zone for selecting an available one of the cars to answer such up demand, means responsive to assignment of an available car at the main landing to answer the up demand and to the subsequent availability of a car above the express zone while the last-named assigned car travels up through the express zone for transferring the assignment to the subsequentially available car.

7. A system as claimed in claim 6 in combination with means for assigning to park and be available at a landing above the express zone a number of cars available at the main landing dependent on a function of the number of cars available at the main landing, the number of available cars above the express zone, and the traffic demand above the express zone.

8. A transportation system as claimed in claim 1 wherein said assigning means includes means maintaining said assigning means effective for said assigning and starting for a substantial time after a vehicle having said person-operable means in operated condition leaves said main landing.

9. A transportation system as claimed in claim 1 wherein said assigning means when operated is effective for assigning and starting a number of said last-named vehicles equal to a predetermined number less the number of vehicles traveling towards the main landing.

10. A transportation system as claimed in claim 1 in combination with means responsive to the presence at the main landing of a predetermined number of said vehicles for rendering the assigning means ineffective.

11. A transportation system as claimed in claim 1 in combination with means responsive to a predetermined traffic condition for rendering said assigning means ineffective.

12. A transportation system as claimed in claim 11 wherein said traffic condition is a predetermined demand for elevator service toward the main landing.

13. An elevator system as claimed in claim 3 in combination with means responsive to a predetermined demand for elevator service to the main landing for blocking said assignment by the assigning means.

References Cited

UNITED STATES PATENTS

| | | | |
|---|---|---|---|
| 2,776,732 | 1/1957 | Eames | 187—29 |
| 3,379,284 | 4/1968 | Yeasting | 187—29 |

THOMAS E. LYNCH, Primary Examiner